US012685615B2

(12) United States Patent
Lvova et al.

(10) Patent No.:    US 12,685,615 B2
(45) Date of Patent:         Jul. 21, 2026

(54) SYSTEMS AND METHODS FOR FORMING ERUPTION COMPENSATION FEATURES FOR ACCOMMODATING ERUPTING TEETH

(71) Applicant: Align Technology, Inc., San Jose, CA (US)

(72) Inventors: Maria Lvova, Yerevan (AM); Vladimir Chistyakov, Moscow (RU); Mitra Derakhshan, Herndon, VA (US); Jeeyoung Choi, Sunnyvale, CA (US); Xi Cai, San Jose, CA (US); Palak Mittal, Sunnyvale, CA (US)

(73) Assignee: Align Technology, Inc., San Jose, CA (US)

( * ) Notice:    Subject to any disclaimer, the term of this patent is extended or adjusted under 35 U.S.C. 154(b) by 53 days.

(21) Appl. No.: 18/618,968

(22) Filed:    Mar. 27, 2024

(65)    Prior Publication Data

US 2024/0325114 A1    Oct. 3, 2024

Related U.S. Application Data

(60) Provisional application No. 63/492,465, filed on Mar. 27, 2023.

(51) Int. Cl.
*G06T 7/11*    (2017.01)
*A61C 7/00*    (2006.01)
*G06T 17/00*    (2006.01)

(52) U.S. Cl.
CPC ............... *A61C 7/002* (2013.01); *G06T 7/11* (2017.01); *G06T 17/00* (2013.01); *G06T 2207/30036* (2013.01)

(58) Field of Classification Search
CPC .. A61C 7/002; A61C 7/08; G06T 7/11; G06T 17/00; G06T 2207/30036; G06T 2210/41; G06T 2219/2016; G06T 2219/2021; G06T 19/20
See application file for complete search history.

(56)    References Cited

U.S. PATENT DOCUMENTS

| | | | |
|---|---|---|---|
| 6,152,731 A | 11/2000 | Jordan et al. | |
| 6,334,853 B1 | 1/2002 | Kopelman et al. | |
| 6,845,175 B2 | 1/2005 | Kopelman et al. | |
| 6,957,118 B2 | 10/2005 | Kopelman et al. | |
| 7,112,065 B2 | 9/2006 | Kopelman et al. | |
| 7,220,124 B2 | 5/2007 | Taub et al. | |
| 7,236,842 B2 | 6/2007 | Kopelman et al. | |

(Continued)

*Primary Examiner* — Vijay Shankar
(74) *Attorney, Agent, or Firm* — Shay Glenn LLP

(57)    ABSTRACT

Systems and methods for forming eruption compensation (EC) features in dental appliances for accommodating erupting teeth. Methods may include scaling a virtual tooth model by identifying a crown center line along a buccal-lingual axis of the virtual tooth model, enlarging a lingual side of the virtual tooth model relative to the crown center line by a first scaling factor, and enlarging a buccal side of the virtual tooth model relative to the crown center line by a second scaling factor, where the first scaling factor is greater than the second scaling factor. The scaled virtual tooth model may be added to a 3D dental model of the subject's dentition at an EC region to form a modified 3D dental model. The modified 3D dental model including the scaled virtual tooth model corresponding to the erupting tooth may be output.

18 Claims, 12 Drawing Sheets

(56)                References Cited

U.S. PATENT DOCUMENTS

| | | | |
|---|---|---|---|
| 7,333,874 | B2 | 2/2008 | Taub et al. |
| 7,361,020 | B2 | 4/2008 | Abolfathi et al. |
| 7,442,040 | B2 | 10/2008 | Kuo |
| 7,536,234 | B2 | 5/2009 | Kopelman et al. |
| 7,555,403 | B2 | 6/2009 | Kopelman et al. |
| 7,766,658 | B2 | 8/2010 | Tricca et al. |
| 7,862,336 | B2 | 1/2011 | Kopelman et al. |
| 7,871,269 | B2 | 1/2011 | Wu et al. |
| 7,947,508 | B2 | 5/2011 | Tricca et al. |
| 8,092,215 | B2 | 1/2012 | Stone-Collonge et al. |
| 8,244,028 | B2 | 8/2012 | Kuo et al. |
| 8,382,474 | B2 | 2/2013 | Boltanski et al. |
| 8,509,932 | B2 | 8/2013 | Kopelman |
| 8,807,999 | B2 | 8/2014 | Kuo et al. |
| 9,375,298 | B2 | 6/2016 | Boronkay et al. |
| 9,408,679 | B2 | 8/2016 | Kopelman |
| 9,492,243 | B2 | 11/2016 | Kuo |
| 9,763,758 | B2 | 9/2017 | Kopelman |
| 10,016,262 | B2 | 7/2018 | Sabina et al. |
| 10,537,405 | B2 | 1/2020 | Choi et al. |
| 10,952,816 | B2 | 3/2021 | Kopelman |
| 11,534,974 | B2 * | 12/2022 | O'Leary ............... B33Y 10/00 |
| RE49,541 | E | 6/2023 | Avi |
| 12,023,216 | B2 * | 7/2024 | Pimenov ............. A61C 9/0053 |
| 2005/0106529 | A1 | 5/2005 | Abolfathi et al. |
| 2006/0115785 | A1 | 6/2006 | Li et al. |
| 2008/0138767 | A1 | 6/2008 | Kuo et al. |
| 2008/0286716 | A1 | 11/2008 | Sherwood |
| 2008/0286717 | A1 | 11/2008 | Sherwood |
| 2019/0152152 | A1 * | 5/2019 | O'Leary ............... B33Y 30/00 |
| 2020/0155274 | A1 * | 5/2020 | Pimenov .................. G06T 7/60 |
| 2023/0225832 | A1 * | 7/2023 | Cramer ................. G16H 20/40 |
| | | | 433/2 |
| 2024/0216106 | A1 * | 7/2024 | Choi ......................... G06T 7/00 |

* cited by examiner

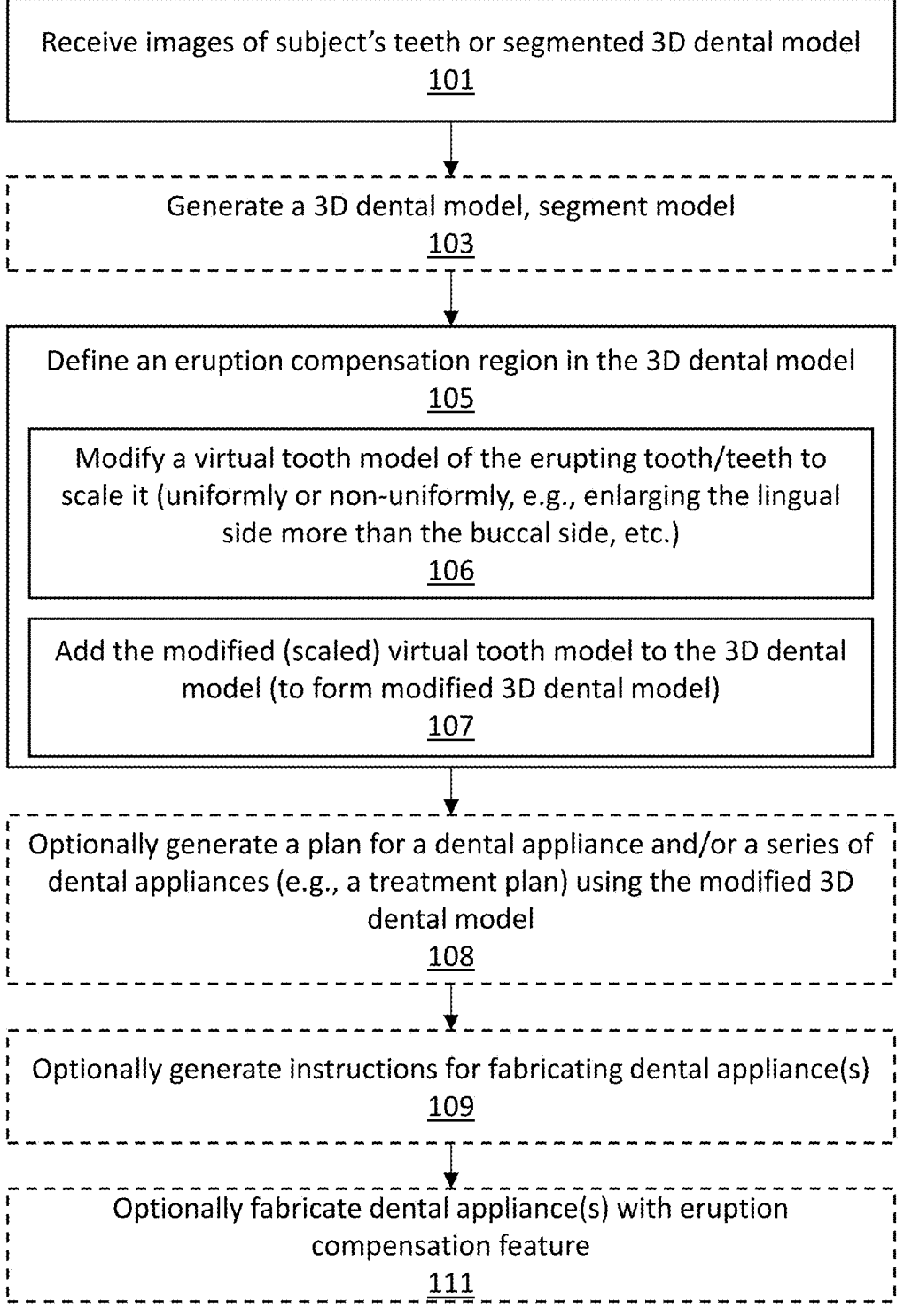

Receive images of subject's teeth or segmented 3D dental model
101

Generate a 3D dental model, segment model
103

Define an eruption compensation region in the 3D dental model
105

Modify a virtual tooth model of the erupting tooth/teeth to scale it (uniformly or non-uniformly, e.g., enlarging the lingual side more than the buccal side, etc.)
106

Add the modified (scaled) virtual tooth model to the 3D dental model (to form modified 3D dental model)
107

Optionally generate a plan for a dental appliance and/or a series of dental appliances (e.g., a treatment plan) using the modified 3D dental model
108

Optionally generate instructions for fabricating dental appliance(s)
109

Optionally fabricate dental appliance(s) with eruption compensation feature
111

FIG. 1

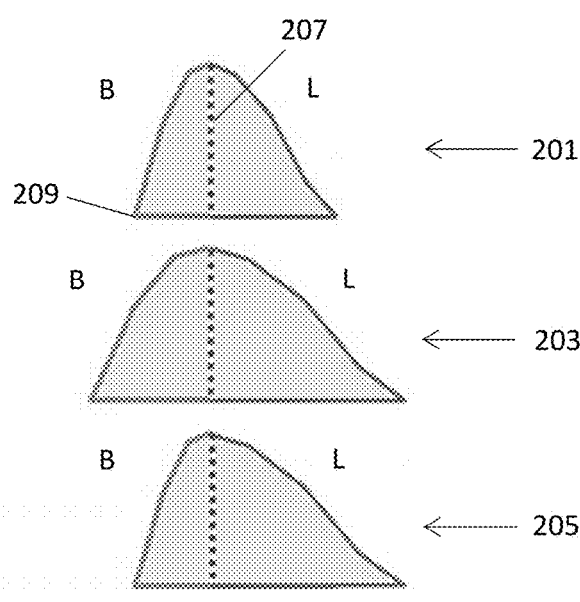
FIG. 2A
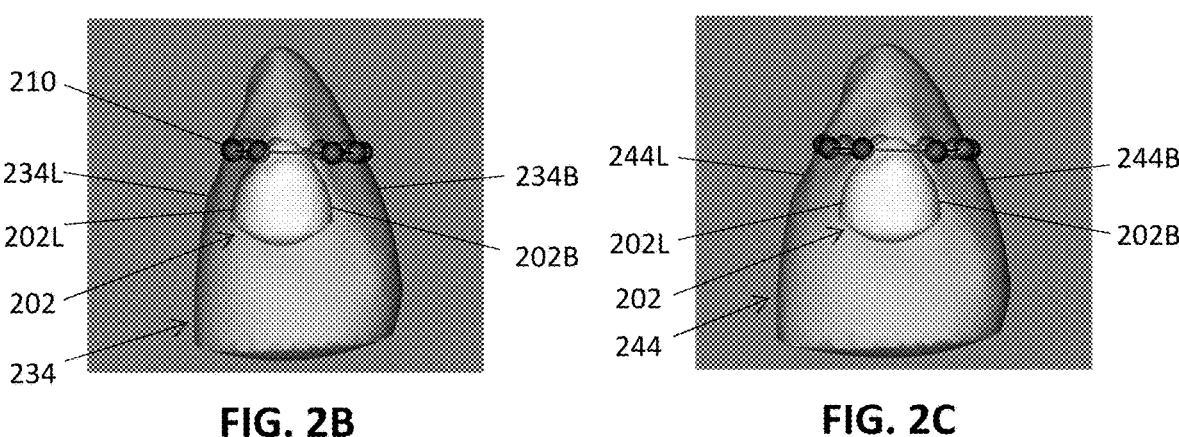
FIG. 2B                 FIG. 2C
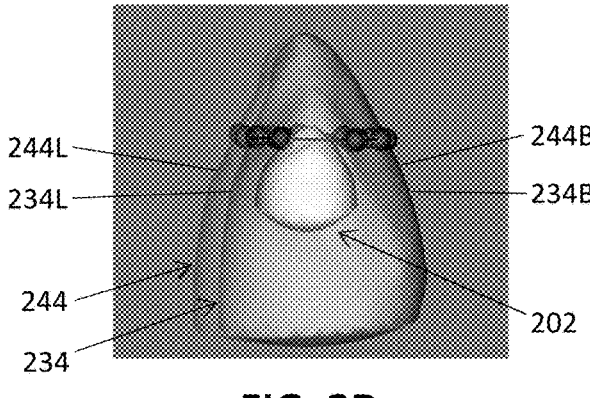
FIG. 2D

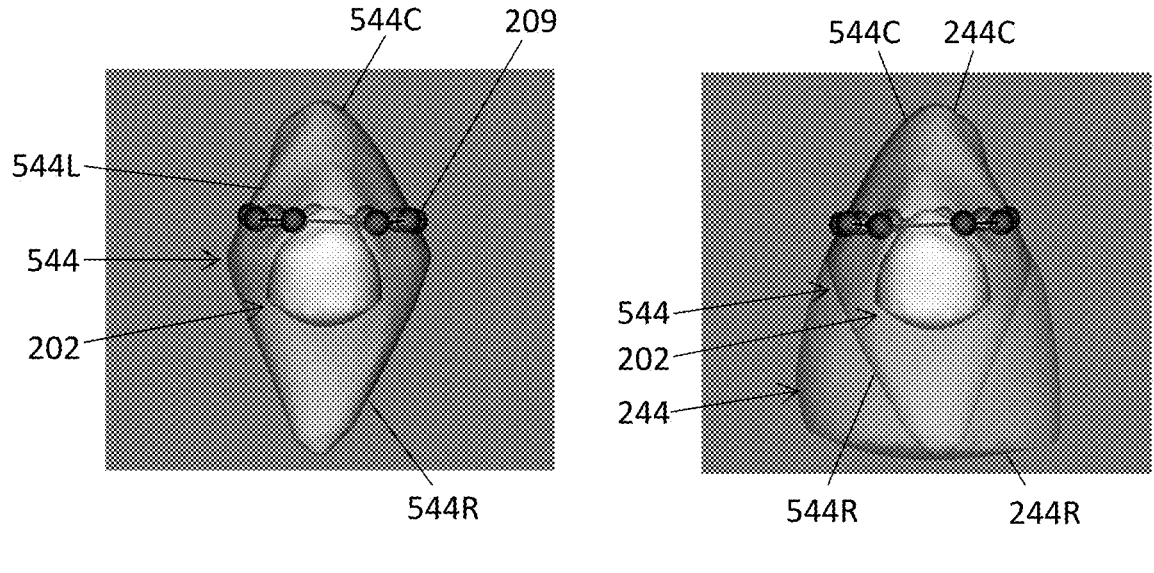
FIG. 5A             FIG. 5B
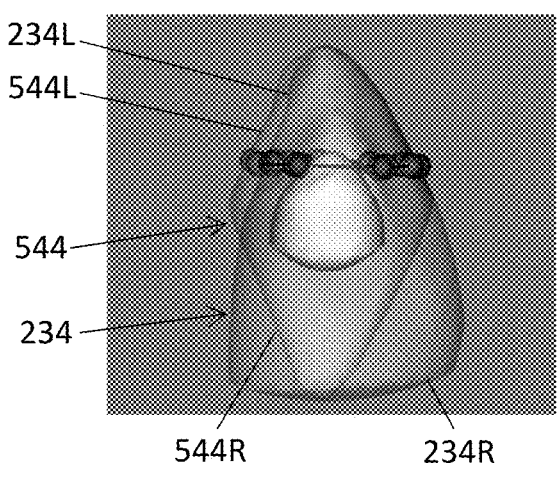
FIG. 5C

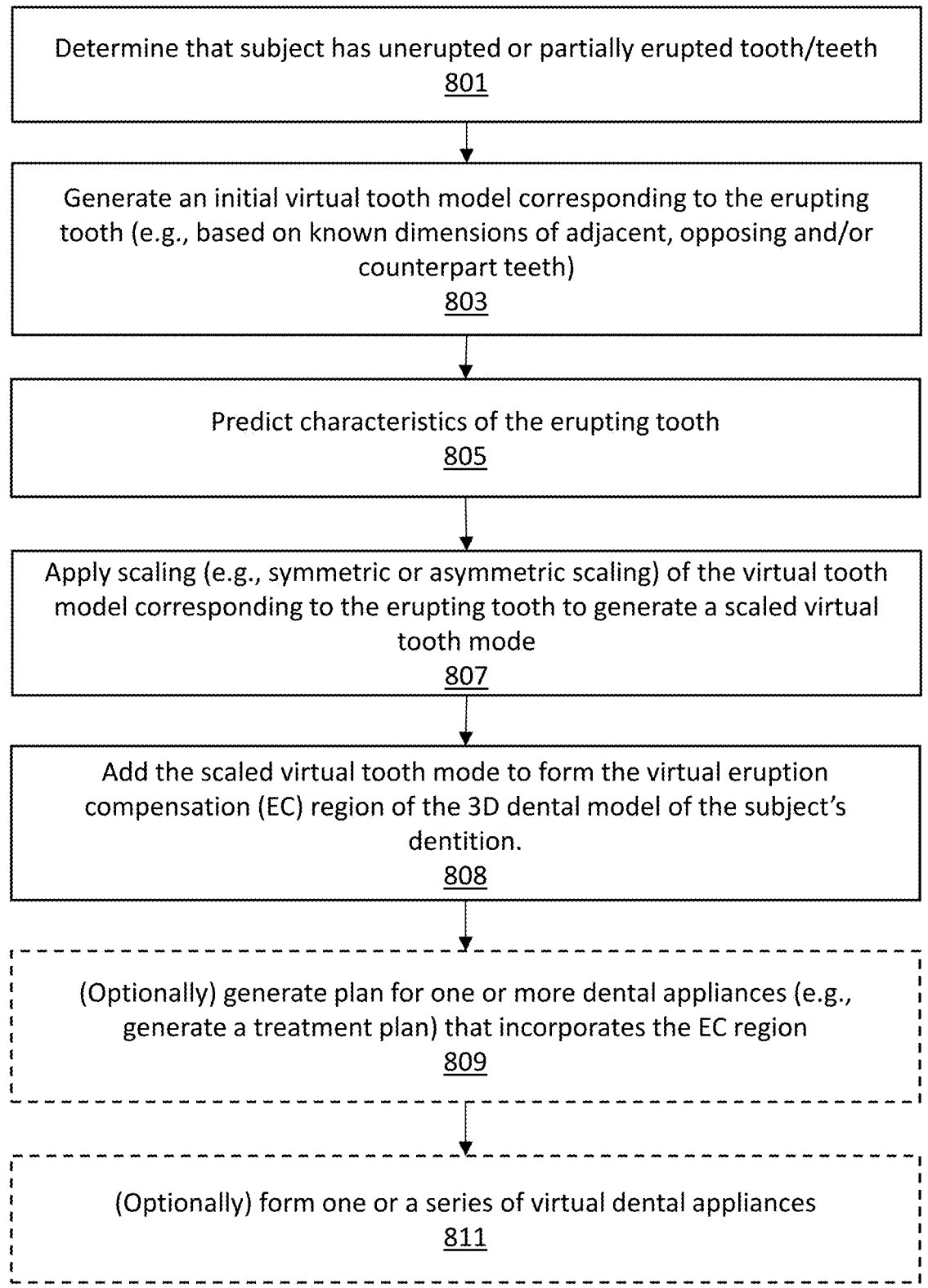

Determine that subject has unerupted or partially erupted tooth/teeth
801

Generate an initial virtual tooth model corresponding to the erupting tooth (e.g., based on known dimensions of adjacent, opposing and/or counterpart teeth)
803

Predict characteristics of the erupting tooth
805

Apply scaling (e.g., symmetric or asymmetric scaling) of the virtual tooth model corresponding to the erupting tooth to generate a scaled virtual tooth mode
807

Add the scaled virtual tooth mode to form the virtual eruption compensation (EC) region of the 3D dental model of the subject's dentition.
808

(Optionally) generate plan for one or more dental appliances (e.g., generate a treatment plan) that incorporates the EC region
809

(Optionally) form one or a series of virtual dental appliances
811

SYSTEMS AND METHODS FOR FORMING ERUPTION COMPENSATION FEATURES FOR ACCOMMODATING ERUPTING TEETH

CLAIM OF PRIORITY

This patent application claims priority to U.S. Provisional Patent Application No. 63/492,465, titled "DENTAL APPLIANCE WITH ERUPTION COMPENSATION FEATURE FOR AN ERUPTING TOOTH" and filed on Mar. 27, 2023, herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present disclosure is related generally to the field of dental treatment. More particularly, the present disclosure is related to systems, methods, computing device readable media, and devices for creating a dental appliance having an eruption compensation feature to account for an erupting tooth.

BACKGROUND

Orthodontic procedures may include repositioning misaligned teeth and changing bite configurations for improved cosmetic appearance and/or dental function. Orthodontic repositioning can be accomplished, for example, by applying controlled forces to one or more teeth over a period of time. As an example, orthodontic repositioning may be provided through the use of positioning dental appliances for realigning teeth. Such appliances may utilize a thin shell of light weight and/or transparent material having resilient properties, referred to as an "aligner," that generally conforms to a user's teeth but is slightly out of alignment with a current tooth configuration. Placement of an aligner over the teeth can provide controlled forces in specific locations to gradually move the teeth into a new configuration. Repetition of this process with successive aligners in progressive configurations can move the teeth through a series of intermediate arrangements toward a final desired arrangement.

Currently, some of the most often heard clinical barriers for teen utilization of dental appliances relate to challenges due to unerupted teeth. In some situations, a teen or child subject may have one or more teeth that have not fully emerged from the gingiva into their final position in the subject's mouth. For example, orthodontic subjects at growing ages often start their treatment when permanent canines and/or bicuspids are not fully erupted. A tooth that has not emerged from the gingiva may be referred to as not erupted or unerupted, a tooth that has emerged from the gingiva and is moving toward its final position may be referred to as partially erupted, and a tooth in its final position, in relation to eruption, may be referred to as fully erupted.

When designing aligners for subjects with unerupted or partially erupted teeth, in some cases it is desirable to provide space for the teeth to naturally erupt without interference from the aligner since even a small magnitude of consistent or repeated force may impede or stop eruption. However, it can be difficult to provide an appropriately shaped appliance when little or nothing may be known about the tooth that is emerging or has yet to emerge. Thus, a cavity provided in the aligner to provide space for an erupting tooth may be sized incorrectly for the erupting tooth. Additionally, it may be difficult to predict the speed at which the tooth may erupt and, therefore, an aligner may be designed such that it does not properly accommodate the erupting tooth. In some such instances, the tooth may contact one or more surfaces of the dental appliance which may slow the eruption process, cause discomfort to the subject, and/or unintentionally change the positioning of the appliance, among other possible issues.

Further, in some situations, an erupting tooth may grow out of place in relation to the jaw arch, such as in the case of an ectopic tooth, which may also be difficult to predict. In such cases, the position of the erupting tooth may be shifted in the buccal or lingual direction from a desirable position in the arch. Such a displaced erupting tooth may cause the aligner to not fit properly, thereby making wearing of the appliance uncomfortable. In some cases, the appliance may not fit at all and/or the appliance may stop the tooth from erupting.

SUMMARY OF THE DISCLOSURE

Described herein are systems, methods, and devices for creating one or more dental appliances (e.g., aligners) having one or more eruption compensation (EC) features to provide room for an erupting tooth, including teeth that are erupting ectopically. In some examples, the EC feature may include a cavity, bubble, space, or gap formed within an aligner shell. When the dental appliance is worn on the subject's dentition, the EC feature may be aligned with a predicted position of an erupting tooth, thereby allowing natural eruption with reduced or minimal potential interference with surfaces of the dental appliance.

The methods described herein may be used to predict dimensions and/or a position an unerupted or partially erupted tooth as it is erupting. Compared to previous systems, methods and devices, the systems, methods, and devices described herein may be used to generate dental appliances with EC features that result in a better fit. In general, this may be done by scaling the EC feature based on one or more factors in order to provide an EC region that is appropriately oversized so as to accommodate the erupted or erupting tooth, without interfering with the alignment of other, including adjacent, teeth and in some cases assisting in positioning the erupting tooth.

In general, scaling of the EC region may be performed as described herein using a single scaling factor. In some cases, the scaling factor may be the same regardless of base EC region size. For example, based on a size comparison between the base EC region with the size of the fully erupted tooth, the methods and apparatuses described herein may estimate an average scaling factor to ensure that a majority of EC will be larger than fully erupted size. In some cases the scaling factor may be determined by one or more of: the tooth type, one or more different factors in the orientation of the tooth (e.g., anterior/posterior, lingual/buccal, mesial/distal, etc.). In some cases the scaling factor for the EC region may be based on the type of tooth (e.g., the predicted tooth size) and/or the portion of the EC with respect to the dentition. For example, the scaling factor in the mesial/distal direction may be smaller (e.g., between 1.05 and 1.2) as compared with the scaling factor in the buccal/lingual direction (e.g., between 1.1-1.4, etc.).

In any of these apparatuses, the scaling factor may be adjusted based on the initial size of the EC region. The size of the EC region may be determined or based on the type and location of the tooth, and/or based on the estimated size of the fully erupted tooth. For example, the methods an apparatuses described herein may determine a scaling factor from a distribution of the base EC size (e.g., based on the estimated size of the fully erupted tooth) as compared to average or population sizes of a corresponding EC region for the same tooth type/location; if the specific patient EC is larger than the historical average EC size by a predetermined percentage, then the scaling factor may be set to be relatively smaller (e.g., between about 1.05 and 1.1, e.g., between 91% and 99% of the uncorrected scaling factor), and if the given EC is smaller than the average, a larger scaling factor may be used (e.g., between about 1.15 and 1.25, e.g., between 101% and 130% of the uncorrected scaling factor). The uncorrected scaling factor may be, e.g., 1.1. In some examples the uncorrected scaling factor may be based on the tooth type and orientation/location, as mentioned above. Thus, the scaling factor may be determined by tooth type, and possibly different factors in direction or orientation of the tooth, and may further be corrected based on the size of the erupting tooth (e.g., reducing the EC size for those larger than a threshold size, based on tooth type, or increasing the EC size for those smaller than a threshold size, based on tooth type).

In some cases the scaling factor may be customized for a given EC based on the base EC size, tooth type, available space, and other factors (e.g., treatment stage, other concurrent or subsequent treatments, etc.).

In any of these methods and apparatuses, the EC may be scaled dynamically. For example, dynamic scaling of the EC from an initial treatment stage of a treatment plan to a final treatment stage of a treatment plan may be based on the available arch space. In some cases the dynamic scaling may be in a vertical direction, e.g., adjusting the height/depth of the EC based on the tooth eruption status, stage and/or rate. In some cases this may be based on a prediction of the tooth eruption rate and corresponding scaling of EC size.

For example, a method may comprising: defining, on a segmented three-dimensional (3D) dental model of the subject's dentition, an eruption compensation (EC) region for accommodating an erupting tooth in the 3D dental model by: identifying a virtual tooth model corresponding to the erupting tooth; scaling the virtual tooth model by one or more scaling factors to enlarge all or a region of the virtual tooth model, wherein the one or more scaling factors is based on a comparison of a predicted size of the erupting tooth, a tooth type of the erupting tooth and the location and/or orientation of the erupting tooth relative to the subject's dentition; adding the scaled virtual tooth model to the 3D dental model of the subject's dentition at the EC region to form a modified 3D dental model; and outputting the modified 3D dental model including the scaled virtual tooth model corresponding to the erupting tooth.

In any of these methods, scaling may comprise asymmetrically scaling the virtual tooth model. The scaling factor may be between about 1.05 and about 1.3. Any of these methods may include adjusting a size, a shape, or a size and shape of a root portion of the scaled virtual tooth model such that the root portion remains within a gingival region of the modified 3D dental model. Adjusting the size, the shape or the size and shape of the root portion may comprise tapering the root portion of the scaled virtual tooth model. Any of these methods may include identifying that the subject's dentition includes an erupting tooth, wherein the erupting tooth is unerupted or partially erupted. For example, identifying the virtual tooth model corresponding to the erupting tooth may comprise identifying the virtual tooth model from one or more of: a library of virtual tooth models, a scaled-up scan of the erupting tooth, a tooth adjacent to the unerupted or erupting tooth, an opposing tooth to the erupting tooth, or a counterpart tooth to the erupting tooth. Any of these methods may include generating a treatment plan using the modified 3D dental model, wherein the treatment plan includes one or more treatment stage operations to move the subject's dentition from a first arrangement toward a target arrangement.

In general, outputting may comprise fabricating a dental appliance including an EC feature having a shape corresponding to the scaled virtual tooth model to provide space for the erupting tooth when the subject wears the dental appliance. Any of these methods may include receiving one or more images of a subject's dentition and generating the segmented 3D dental model of the subject's dentition. Scaling may comprise identifying a lingual side and a buccal side of the virtual tooth model relative to a crown center line along a buccal-lingual axis virtual tooth model and scaling the lingual side of the virtual tooth model more than the buccal side.

Any of these methods may include adjusting the scaling factor to avoid collision of the EC feature with a tooth of the opposing dental arch of the subject when the subject bites.

Defining the EC regions may be part of a porting process to generate a treatment plan. For example, the porting process may comprise converting a first data file to a second data file, the second data file having a reduced size compared to the first data file. A first scaling factor may be applied to the lingual side and a second scaling factor is applied to the buccal side, wherein the first scaling factor is greater than the second scaling factor.

Any of these methods may include (in addition to or in place of the outputting step) generating one or more dental appliances including the EC region. As used herein, generating the one or more dental appliances may include generating a digital model of the one or more dental appliances and/or fabricating the one or more dental appliances (e.g., from the digital model).

Any of these methods and apparatuses may use an asymmetric scaling process, in which different scaling factors may be applied to different regions of a predicted geometry of an unerupted to partially erupted tooth. For example, a different scaling factor may be applied to a lingual side of the predicted geometry of the tooth compared to a scaling factor applied to a buccal side of the tooth. The resulting dental appliance may better account for teeth that erupt out of the dental arch (e.g., ectopic teeth), thereby providing a better fit for the subject's dentition.

In any of these examples asymmetric scaling may be used to define an EC region of a three dimensional (3D) dental model of a subject's dentition. In general the EC region may correspond to a region of the virtual dental model having a shape and size for accommodating the unerupted or partially erupted tooth as it erupts. In some cases the asymmetric scaling may result in an EC region that is larger on a lingual side or buccal side relative to the tooth to account for ectopic tooth situations, resulting in an aligner having a shape that is able to capture the ectopic tooth. Further, even when the erupting tooth is erupting in the correct location, the use of asymmetric scaling may reflect the asymmetric nature of the tooth geometry itself, buccal vs lingual of anterior teeth. The curvature of buccal surface from the incisal edge toward the gingiva is typically different from that of lingual surface.

The lingual side may start slim in the incisal edge and become much bulkier toward the gingiva as compared to the buccal side. The buccal-lingual width may be off-centered compared to the root axis line of the tooth. Thus the methods and apparatuses described herein may provide a larger scaling factor for the lingual side than for the buccal side.

In some examples, a dynamic scaling process is used where the shape and size of the EC region is limited based on avoiding possible interactions of a resulting EC feature with other teeth in the subject's dentition over the course of treatment. For example, the dynamic process may be based on avoiding interaction with an opposing tooth of the opposite jaw when the dentition is in a bite configuration.

In some examples, a root portion of the of the predicted geometry of the unerupted or partially erupted tooth may be unscaled, as compared to a scaling factor applied to a crown of the predicted geometry of the unerupted or partially erupted tooth. This can make it easier for a user (e.g., dental practitioner) to distinguish between a crown portion and a root portion of a tooth or aligner in a virtual environment.

According to some examples, a method of digital treatment planning includes: receiving or generating a three-dimensional (3D) model of the subject's dentition based on one or more images of a subject's dentition; segmenting the 3D model of the subject's dentition (if it was not already segmented when received); defining an eruption compensation (EC) region for accommodating an erupting tooth in the 3D dental model by applying one or more scaling factors; in some cases separately scaling the lingual and buccal sides of a predicted virtual tooth model of the erupting tooth wherein the predicted tooth model is positioned within the 3D dental model at the EC region; generating a treatment plan using the 3D dental model, wherein the treatment plan includes one or more treatment stage operations to move the subject's dentition from a first arrangement toward a target arrangement; and providing instructions to fabricate a series of incremental dental appliances to implement the treatment plan, wherein at least one of the dental appliance of the series of dental appliances includes an EC feature having a shape corresponding to the predicted tooth model at the EC region to provide space for the erupting tooth when the subject wears the at least one of the series of dental appliances. Any of these methods may also include fabricating one or more dental appliances including the EC feature.

Any of these methods may include adjusting the scaling factor based on one or more of: erupting tooth size, erupting tooth location and/or orientation, etc.

In some cases different scaling factors may be applied to the lingual and buccal sides relative to a crown center line along a buccal-lingual axis of the predicted virtual geometry of the erupting tooth. The method may further include limiting a scaling factor applied to the lingual side or the buccal side to avoid collision of the EC feature with a tooth of the opposing dental arch of the subject when the subject bites. The method may further include limiting a scaling factor applied to the lingual side or the buccal side within a maximum threshold value associated with an unnatural feel or appearance of the EC feature. Defining the one or more EC regions may be part of a porting process to set up the 3D dental model for generating the treatment plan. The porting process may include converting a first data file to a second data file, the second data file having a reduced size compared to the first data file. A first scaling factor may be applied to the lingual side and a second scaling factor is applied to the buccal side. The first scaling factor may be greater than the second scaling factor. The second scaling factor may be greater than the first scaling factor. The method may further include adjusting a size, a shape, or a size and shape of a root portion of the EC region such that the root portion remains within a gingival region of the 3D dental model. The method may further include determining the scaling factors applied to the lingual and buccal sides based on statistical analysis of clinical cases.

A system may include: one or more computing devices including: one or more processors; memory operationally coupled to the one or more processors, wherein the memory includes computer-program instructions that, when executed by the one or more processors, cause the one or more computing devices to perform a computer-implemented method including: receiving one or more images of a subject's dentition or a three-dimensional (3D) dental model of the subject's dentition; if the 3D dental model is not segmented (e.g., when received), segmenting the 3D dental model of the subject's dentition (the segmented 3D digital model may include identifiers for constituent portions of the subject's dentition); defining an eruption compensation (EC) region for accommodating an erupting tooth in the 3D dental model by applying one or more (e.g., different) scaling factors to a predicted virtual geometry of the erupting tooth; generating a treatment plan using the 3D dental model, wherein the treatment plan includes one or more treatment stage operations to move the subject's dentition from a first arrangement toward a target arrangement; and providing instructions to fabricate a series of incremental dental appliances to implement the treatment plan, wherein at least one of the series of dental appliances includes an EC feature having a shape corresponding to the EC region to provide space for the erupting tooth when the subject wears the at least one of the series of dental appliances. In any of these examples the scaling factor may be adjusted based on the size of the erupting tooth corresponding to the EC, the location, and/or the orientation of the erupting tooth. In any of the examples the EC may be scaled with different scaling factors (or a differently adjusted scaling factor) for the lingual and buccal sides of the predicted virtual geometry of the erupting tooth.

For example, according to some examples, a system includes: one or more computing devices including: one or more processors; memory operationally coupled to the one or more processors, wherein the memory includes computer-program instructions that, when executed by the one or more processors, cause the one or more computing devices to perform a computer-implemented method including: receiving one or more images of a subject's dentition or a three-dimensional (3D) dental model of the subject's dentition; if the 3D dental model is not segmented (e.g., when received), segmenting the 3D dental model of the subject's dentition (the segmented 3D digital model may include identifiers for constituent portions of the subject's dentition); defining an eruption compensation (EC) region for accommodating an erupting tooth in the 3D dental model by applying different scaling factors to lingual and buccal sides of a predicted virtual geometry of the erupting tooth; generating a treatment plan using the 3D dental model, wherein the treatment plan includes one or more treatment stage operations to move the subject's dentition from a first arrangement toward a target arrangement; and providing instructions to fabricate a series of incremental dental appliances to implement the treatment plan, wherein at least one of the series of dental appliances includes an EC feature having a shape corresponding to the EC region to provide space for the erupting tooth when the subject wears the at least one of the series of dental appliances.

The computer-implemented method may further include collecting the one or more images of a subject's dentition using an intraoral scanner. The different scaling factors may be applied to the lingual and buccal sides relative to a crown center line along a buccal-lingual axis of the predicted virtual geometry of the erupting tooth. Defining the EC region may include limiting a scaling factor applied to the lingual side or the buccal side to avoid collision of the EC feature with a tooth of the opposing dental arch of the subject when the subject bites. Defining the EC region may include limiting a scaling factor applied to the lingual side or the buccal side within a maximum threshold value associated with an unnatural feel or appearance of the EC feature. Defining the one or more EC regions may be part of a porting process to set up the 3D dental model for generating the treatment plan, wherein the porting process includes converting a first data file to a second data file, the second data file having a reduced size compared to the first data file. A first scaling factor may be applied to the lingual side and a second scaling factor is applied to the buccal side. The first scaling factor may be greater than the second scaling factor. The second scaling factor may be greater than the first scaling factor. Defining the EC region may further include adjusting a size, a shape, or a size and shape of a root portion of the EC region such that the root portion remains within a gingival region of the 3D dental model. The computer-implemented method may further include fabricating the series of incremental dental appliances based on the fabrication instructions.

For example, described herein are methods including: defining, on a segmented three-dimensional (3D) dental model of the subject's dentition, an eruption compensation (EC) region for accommodating an erupting tooth in the 3D dental model by: identifying a virtual tooth model corresponding to the erupting tooth; scaling a lingual side of the virtual tooth model by a scaling factor to enlarge the lingual side of the virtual tooth model more than a buccal side of the virtual tooth model; adding the scaled virtual tooth model to the 3D dental model of the subject's dentition at the EC region to form a modified 3D dental model; and outputting the modified 3D dental model including the scaled virtual tooth model corresponding to the erupting tooth.

In some examples, a method includes: identifying that the subject's dentition includes an erupting tooth; defining, on a segmented three-dimensional (3D) dental model of the subject's dentition, an eruption compensation (EC) region for accommodating an erupting tooth in the 3D dental model by: identifying a virtual tooth model corresponding to the erupting tooth; scaling a lingual side of the virtual tooth model by a scaling factor to enlarge the lingual side of the virtual tooth model more than a buccal side of the virtual tooth model, wherein the scaling factor is between about 1.1 and about 1.3 fold relative to the buccal side of the virtual tooth model; adding the scaled virtual tooth model to the 3D dental model of the subject's dentition at the EC region to form a modified 3D dental model; and outputting the modified 3D dental model including the scaled virtual tooth model corresponding to the erupting tooth.

In some examples, the scaling factor is between about 1.1 and about 1.3 times (e.g., 1.3 fold) the relative to the buccal side of the virtual tooth model. For example, the first scaling factor may be applied to the lingual side and a second scaling factor is applied to the buccal side, wherein the first scaling factor is greater than the second scaling factor.

Any of these methods and apparatuses may include identifying that the subject's dentition includes an erupting tooth, wherein the erupting tooth is unerupted or partially erupted. Identifying the presence of an erupting tooth may be performed automatically and/or manually.

Any of these methods and apparatuses may include adjusting a size, a shape, or a size and shape of a root portion of the scaled virtual tooth model such that the root portion remains within a gingival region of the modified 3D dental model. For example, adjusting the size, the shape or the size and shape of the root portion may include tapering the root portion of the scaled virtual tooth model.

In any of these methods and apparatuses identifying the virtual tooth model corresponding to the erupting tooth may comprise identifying the virtual tooth model from one or more of: a library of virtual tooth models, a scan of the erupting tooth, a tooth adjacent to the unerupted or erupting tooth, an opposing tooth to the erupting tooth, or a counterpart tooth to the erupting tooth. The virtual tooth model corresponding to the erupting tooth may be initially scaled and configured to be positioned in the 3D dental model. For example the virtual tooth model corresponding to the erupting tooth may be initially selected or formed based on one or more of: a scan (e.g. penetrative scan) of the erupting tooth from the subject's dentition, a library of virtual tooth models, a tooth adjacent to the unerupted or erupting tooth, an opposing tooth to the erupting tooth, or a counterpart tooth to the erupting tooth. The initial virtual tooth model corresponding to the erupting tooth may be positioned within the 3D dental model so that it is oriented and initially sized (e.g. scaled) based on the scan (e.g., penetrative scan), a tooth adjacent to the unerupted or erupting tooth, an opposing tooth to the erupting tooth, or a counterpart tooth to the erupting tooth. The virtual tooth model may then be asymmetrically scaled. For example, a method or apparatus may include scaling the lingual side of the virtual tooth model by identifying a lingual side and a buccal side of the virtual tooth model relative to a crown center line along a buccal-lingual axis virtual tooth model, e.g. after preliminarily positioning the virtual tooth model within the 3D digital model. The virtual tooth model may be scaled, e.g., on the lingual side (but not further scaled on the buccal side) using the identified lingual and buccal sides of the teeth. Alternatively a standard division between the lingual and buccal sides of the virtual tooth model may be applied (e.g., defined only relative to the virtual tooth model itself, e.g., through a plane extending from crown to root, and bisecting the virtual tooth model into front/back regions).

Any of these methods may include adjusting the scaling factor to avoid collision of the EC feature with a tooth of the opposing dental arch of the subject when the subject bites.

In any of these methods and apparatuses a treatment plan may be generated using the modified 3D dental model, wherein the treatment plan includes one or more treatment stage operations to move the subject's dentition from a first arrangement toward a target arrangement.

As mentioned, any of these methods and apparatuses may include fabricating a dental appliance including an EC feature having a shape corresponding to the scaled virtual tooth model to provide space for the erupting tooth when the subject wears the dental appliance.

In general, the methods and apparatuses described herein may include receiving the 3D dental model in which the subject's teeth are segmented. Alternatively or additionally, the methods and apparatuses may include receiving one or more images of a subject's dentition and generating the segmented 3D dental model of the subject's dentition.

The process for generating the modified 3D dental model including the scaled virtual tooth model corresponding to the erupting tooth may be performed at any appropriate part of a method for generating a dental appliance, a series of dental appliances or a treatment plan involving a series of dental appliances. For example the process may be part of a porting process to generate a treatment plan. In some examples, the porting process comprises converting a first data file to a second data file, the second data file having a reduced size compared to the first data file.

Also described herein are systems and software (e.g., non-transitory computer-readable storage medium) for performing any of these methods (and any associated steps or optional processes) as described herein. For example, described herein are non-transitory computer-readable storage medium storing instructions that, when executed by one or more processors, cause the one or more processors to perform a method comprising: defining, on a segmented three-dimensional (3D) dental model of the subject's dentition, an eruption compensation (EC) region for accommodating an erupting tooth in the 3D dental model by: identifying a virtual tooth model corresponding to the erupting tooth; scaling a lingual side of the virtual tooth model by a scaling factor to enlarge the lingual side of the virtual tooth model more than a buccal side of the virtual tooth model; adding the scaled virtual tooth model to the 3D dental model of the subject's dentition at the EC region to form a modified 3D dental model; and outputting the modified 3D dental model including the scaled virtual tooth model corresponding to the erupting tooth.

For example, described herein are systems comprising: one or more computing devices comprising: one or more processors; memory operationally coupled to the one or more processors, wherein the memory includes computer-program instructions that, when executed by the one or more processors, cause the one or more computing devices to perform a computer-implemented method comprising: defining, on a segmented three-dimensional (3D) dental model of the subject's dentition, an eruption compensation (EC) region for accommodating an erupting tooth in the 3D dental model by: identifying a virtual tooth model corresponding to the erupting tooth; scaling a lingual side of the virtual tooth model by a scaling factor to enlarge the lingual side of the virtual tooth model more than a buccal side of the virtual tooth model; adding the scaled virtual tooth model to the 3D dental model of the subject's dentition at the EC region to form a modified 3D dental model; and outputting the modified 3D dental model including the scaled virtual tooth model corresponding to the erupting tooth.

All of the methods and apparatuses described herein, in any combination, are herein contemplated and can be used to achieve the benefits as described herein.

These and other aspects are described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIG. 1 schematically illustrates an example of a method or process as described herein.

FIG. 2A are graphs illustrating example buccal-lingual shapes of EC region formed using symmetric scaling and asymmetric scaling processes.

FIGS. 2B-2D illustrate example virtual 3D models showing buccal-lingual views of virtual models of an unerupted or partially tooth and associated EC regions calculated using symmetric scaling and asymmetric scaling processes.

FIGS. 5A-5C illustrate example virtual 3D models showing buccal-lingual views of the EC region of FIG. 2C after a root modification process is applied.

FIG. 8 is a flowchart illustrating an example process for forming an EC region and EC feature using scaling.

FIGS. 13A-13D illustrate an example of scaling a virtual tooth model in order to scale and EC region as described herein. FIGS. 13A and 13C show the unscaled predicted erupting tooth and FIGS. 13B and 13D show the scaled predicted tooth.

DETAILED DESCRIPTION

Figure 3A:
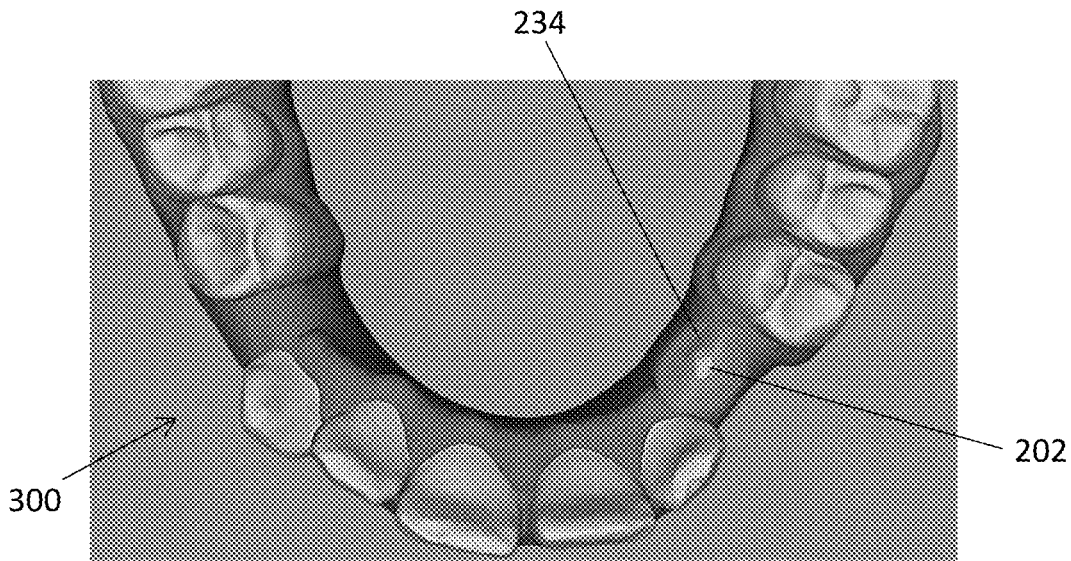
FIGS. 3A-3B illustrate example aerial and perspective views, respectively, of the EC region of FIG. 2B formed using a symmetric scaling method incorporated in a dental model.

The methods, systems and devices described herein relate to dental appliances (e.g., aligners) having one or more eruption compensation (EC) features to provide room for eruption of unerupted or erupting teeth in a subject's dentition. The approaches described herein may be implemented to accommodate teeth that erupt out of line with a subject's dental arch (ectopically). Also described are software and graphical user interfaces (GUIs) that allow for virtual dental modeling and orthodontic planning related to EC features.

Teen or child subjects often start orthodontic treatment when some of the anterior teeth are not erupted or are partially erupted. It may be difficult for dental practitioners to predict eruption time, rate, size of the tooth, orientation, and/or location during the course of a dental treatment process. Thus, it may be difficult to determine whether, when and to what extent a tooth will erupt out of place in relation to the dental arch, such as in the case of an ectopic tooth. This may happen because a primary tooth has not exfoliated on time and occupies the place of the erupting permanent tooth and/or adjacent teeth may be located too close to each other so that there is not enough space between them for the erupting permanent tooth. If a tooth ends up erupting ectopically during treatment, a dental appliance may not fit properly, interrupt tooth eruption and/or be uncomfortable to wear.

The terms "orthodontic aligner", "aligner", or "dental aligner" are synonymous with the terms "appliance" and "dental appliance" with regard to the dental applications described herein. For purposes of clarity, embodiments are hereinafter described within the context of the use and application of appliances, and more specifically "dental appliances."

A "subject," as used herein, may be any subject (e.g., human, non-human, adult, child, etc.) and may be alternatively and equivalently referred to herein as a "patient", a "patient under treatment", or a "subject." A "patient," as used herein, may but need not be a medical patient. An "subject" or a "patient," as used herein, may include a person who receives orthodontic treatment, including orthodontic treatment with a series of orthodontic aligners.

The methods and systems described herein provide dental appliances that are better adapted to account for the possibility of teeth erupting ectopically, thereby lessening concerns of eruption during treatment, among other benefits. Reducing these clinical barriers for teen utilization can enable treatment professionals to treat more subjects. Further, the procedures may be largely automatically implemented, thereby reducing technician process time and maximizing protocol consistency.

The dental appliances can be designed to include an EC feature, which may correspond to a cavity, bubble, space, or gap formed within a dental appliance, that has a customized shape based on a predicted geometry of tooth while it is in an unerupted or partially erupted state. The EC feature can ensure natural eruption with reduced or minimized potential interference with surfaces of the dental appliance. Example systems and methods for predicting a geometry of an unerupted or partially erupted tooth and for providing a dental appliance with cavity for accommodating the tooth are described in U.S. Pat. No. 10,537,405, which is incorporated by reference herein in its entirety.

Unlike previous systems and methods, in some examples the EC feature described herein may be designed to have an asymmetric shape in relation to the geometry of unerupted or partially tooth. The asymmetry may be in relation to a buccal-lingual axis of the EC feature. For example, a lingual side of the EC feature may be relatively large in relation to the geometry of unerupted or partially tooth compared to a buccal side of the EC feature, thereby accounting for the possibility of the tooth erupting on the lingual side of the dental arch. Alternatively, a buccal side of the EC feature may be relatively large in relation to the geometry of unerupted or partially tooth compared to a lingual side of the EC feature, thereby accounting for the possibility of the tooth erupting on the buccal side of the dental arch.

In general described herein are methods and apparatuses (e.g., systems, devices, etc.) to adjust the size of an EC (scaling) based on one or more factors in a manner that may enhance treatment comfort and efficacy. In some cases the scaling may be performed automatically. In some cases scaling of the EC may be performed semi-automatically (e.g., suggesting one or more scaling factors/adjustments to the EC for approval by a technician and/or dental professional). In some cases the scaling may be manually performed, by a technician or other dental professional.

An EC may be scaled from an initial prediction of the size of the EC that is typically based on the predicted size of the erupting tooth. In some cases the methods and apparatuses (e.g., devices, systems, etc.) may determine the default EC scaling factor when EC is calculated and may adjust this EC based on one or more parameters. The initial EC may be determined by the current predicted EC size, e.g., having a 1.0 scaling factor (unscaled).

In any of these methods and apparatuses the EC may be scaled using a single scaling factor regardless of base EC size (e.g., the initial EC size). For example, based on a size comparison of base EC vs fully erupted tooth, an average scaling factor may be estimated to ensure majority of EC will be larger than fully erupted size. The scaling factor may be determined by tooth type, and in some cases one or more factors in the buccal-lingual (BL) direction, such as crowding, planned movements during treatment planning, etc.

Figure 12:
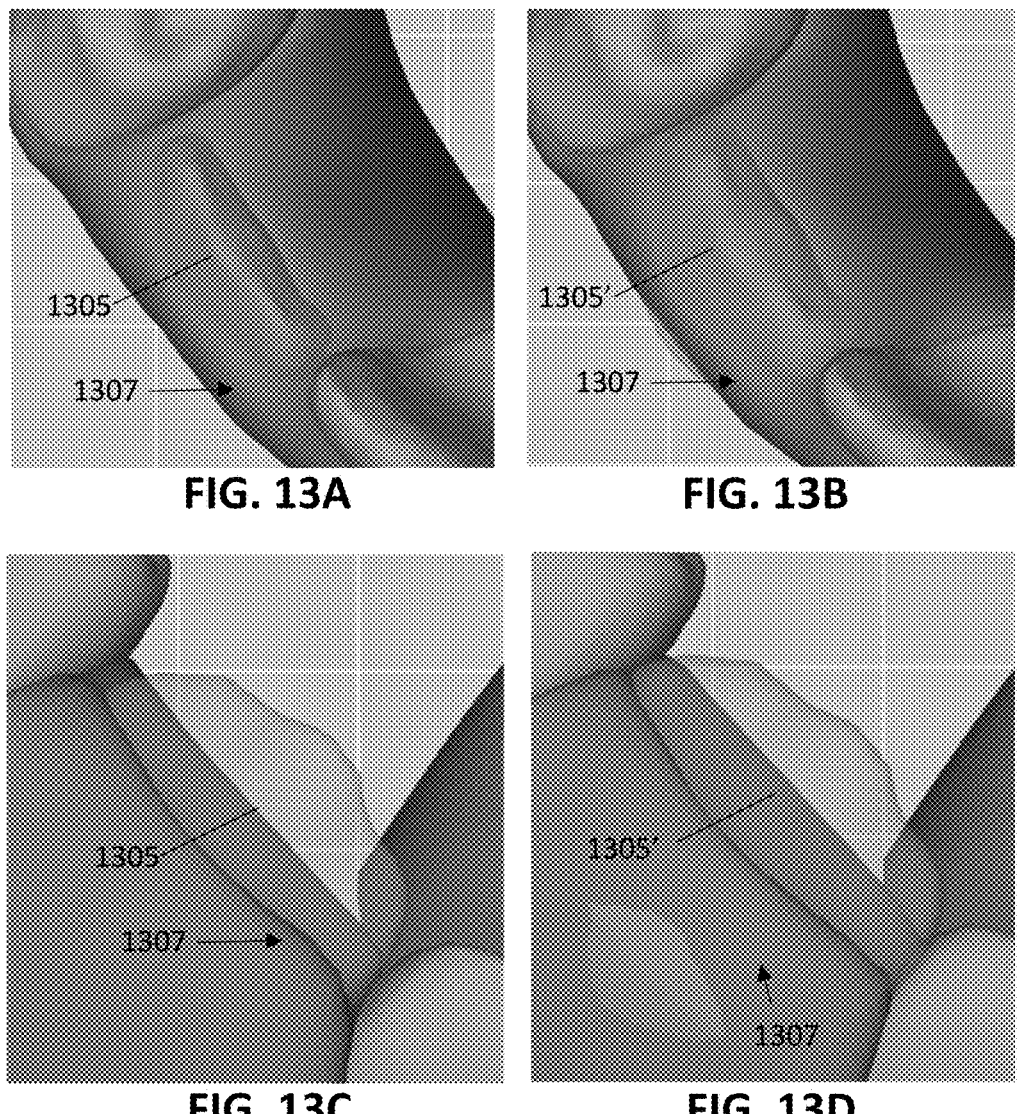
FIG. 12 shows an example of a technique for adjusting the scaling factor of an EC region (e.g., by adjusting the virtual tooth) based on the size of the predicted erupting tooth.

In any of these methods and apparatuses, the scaling factor may be adjusted based on the size of the erupting tooth. For example, the methods and apparatuses described herein may adjust the EC size based by apply a scaling factor that is dependent upon the predicted size of the erupting tooth. A comparison of the predicted erupting tooth size compared to a distribution of the tooth size (for the same type of tooth), and therefore EC size, may be determined and the EC may be adjusted depending upon how the predicted erupting/ectopic tooth compares with the distribution. If the erupting/ectopic tooth is larger than the historical average (and therefore the EC size would be larger than typical), a smaller scaling factor (e.g., between about 1.05 and 1.1), may be used. Conversely, if the predicted erupting/ectopic tooth (and therefore the necessary EC) is smaller than the average, a larger smaller scaling factor (e.g., between about 1.15 and about 1.2) may be used. As mentioned, the scaling factor may be determined by tooth type, and possibly different factors in buccal-lingual (BL) direction. For example, FIG. 12 illustrates a distribution of a particular tooth type (e.g., molar) that may be used to scale the tooth based on the size of the tooth. For example, if the predicted size of the ectopic tooth is within a particular range from the peak the scaling factor may be adjusted accordingly. Counterintuitively, the larger the tooth, the smaller the scaling factor, so that in the $90^{th}$ percentile and above, the ectopic tooth (and therefore the EC region) may be unscaled (e.g., scaling factor=1), where the smaller the tooth, the greater the scaling factor. In the example shown in FIG. 12, a normal distribution based on a population of patients is shown. Other distributions, or ranges of any of these distributions, may be used.

In any of these methods and apparatuses, the scaling factor for the EC region may be customized for a given EC region. The EC region may be scaled based on the size of the erupting/ectopic tooth, based on the available space, based on the location and/or orientation of the erupting/ectopic tooth, based on the stage of treatment and state of erupting (and/or rate of erupting), etc. FIGS. 13A-13D illustrate one example of scaling an erupting tooth as part of the method described herein for generating a scaled EC region that may be used with a dental appliance. In FIGS. 13A and 13C, a digital representation of the erupting tooth 1305 is shown, partially erupted from the digital model of the gingiva 1307. FIGS. 13B and 13D show a scaled version of the erupting tooth 1305', as described herein.

In any of these apparatuses and methods the scaling may be adjusted dynamically. For example, the EC scaling may be adjusted over the course of a treatment plan (e.g., orthodontic treatment plan) from initial stage to final stage based on the available arch space.

As mentioned above, In any of these methods and apparatuses the EC may be scaled differently over different regions of the EC, corresponding to different regions of the tooth (e.g., buccal/lingual, mesial/distal, etc.). Thus, scaling of the EC may be adjusted over a portion of the EC. In some cases scaling may be dynamically adjusted in a vertical direction/height of the EC based on the tooth eruption. For example the scaling of the EC may be modified based on a predicted tooth eruption rate for the erupting/ectopic tooth resulting in a corresponding scaling of EC size.

Any of these methods and apparatuses may therefore result in asymmetric scaling of the EC. For example, the asymmetric scaling may be based on a dynamic process, whereby the shape and size of the enlarged lingual or buccal side of the EC feature is based on avoiding expected interactions of the EC feature with other teeth in the subject's dentition over the course of treatment. In this way, the shape and size of the EC can be designed to account for possible changes that occur to the subject's dentition over the course of treatment. For example, the dynamic process may be based on avoiding interaction of the EC feature with one or more teeth of the opposite jaw when the dentition is in a bite configuration.

FIG. 1 is a flowchart illustrating an example process that may be configured as a process for dental treatment planning that includes the method described herein for generating a 3D model to include lingual space for an erupting tooth. At 101, either or both a 3D digital model of the subject's dentition and/or one or more images of the subject's teeth are received. The 3D digital model may be received as a segmented model (in which the 3D model is divided into different regions, including individual teeth, gingiva, etc.) or it may optionally be segmented 103. The segmentation process may partition the images into multiple object segments, such as separate teeth and soft tissue (e.g., gums). In some cases, each tooth is associated with an identifier based on tooth type (e.g., incisor, canine, premolar or molar). In some cases, a tooth may be partitioned into different regions (e.g., crown, root, enamel, dentin, etc.).

The image(s) may be collected using an intraoral scanner specifically designed for taking multiple images as a scan of a subject's oral cavity. For example, an intraoral scanner may include a wand that is shaped and sized to provide access to regions of the oral cavity that other imaging devices may not easily access. The intraoral scanner may be configured to direct and receive certain wavelengths of radiation. For example, the intraoral scanner may be configured to collect images using infrared, visible light, ultraviolet and/or x-rays (e.g., cone beam computed tomography (CBCT)). In some cases, multiple types of wavelengths (ranges of wavelengths) are used to collect multiple images of the same objects. For example, certain wavelengths may be used to collect surface features of a tooth while other wavelengths may be used to collect internal features (e.g. dentin) and/or root features of the tooth. Additionally or alternatively, the image(s) may be collected using a camera, such as a camera of a mobile phone or other mobile device. The intraoral scanner may be configured to combine multiple images (2D images) into a three-dimensional (3D) image or model of the subject's dentition.

One or more virtual EC regions may be defined in the virtual 3D dental model 105. An EC region refers to a virtual object that is configured to reserve space for an erupting tooth, and has a geometry that is larger in volume than the predicted geometry of the unerupted or partially erupted tooth (e.g., in the mesiodistal, buccolingual and/or coronal-apical dimensions), particularly in the lingual direction as described herein. The outermost surface of the EC region can represent the maximum extent to which a tooth may extend outward from a reference point in three dimensions (based upon the predicted geometry of the unerupted or partially erupted tooth). The EC region may be used to form an EC feature (e.g., cavity, bubble, space, or gap) in a dental appliance (e.g., aligner) that provides room for the erupting tooth when the dental appliance is worn on the subject's dentition. In this manner, an EC feature of a dental appliance cavity may have a size, shape, location, and/or orientation corresponding to that of the EC region and should not contact surfaces of the unerupted or partially erupted tooth as it erupts.

For example, the eruption compensation (EC) region may be defined in (e.g., identified, designed, and/or added to) the digital 3D dental model by generating or identifying a virtual tooth model of the erupting tooth (or teeth, if multiple erupting teeth are indicated) that is representative of the indicated erupting tooth. For example, a virtual tooth model may be based on or formed from a scan (e.g., penetrative scan, such as an X-ray, near-IR scan, etc.) of the subject's dentition. In some examples the virtual tooth model of the unerupted (or erupting) tooth may be based on an adjacent and/or an opposing tooth to the unerupted or erupting tooth, and/or a counterpart tooth to the unerupted or erupting tooth. The virtual tooth model may then be modified 106 to scale the virtual tooth model either uniformly (e.g., between about 1.05 times and about 1.2 times, depending on one or more of the size of the erupting/ectopic tooth, the location and/or orientation of the erupting/ectopic tooth, and/or the type of tooth (e.g., molar, canine, incisor, etc.)), or non-uniformly, including but not limited to preferentially enlarge the lingual side of the virtual tooth, scaling in the anterior/posterior direction more than the mesial/distal direction and/or buccal-lingual direction, etc. For example, the virtual tooth model may be scaled to provide room for the erupting tooth. The lingual side of the virtual tooth may be scaled (e.g., to asymmetrically enlarge it) more than the buccal side of the virtual tooth model. In some examples the lingula side of the tooth may be enlarged by a scaling factor that is between about 1.1 and 1.3. The modified (e.g., asymmetrically scaled) virtual tooth may then be added to the digital 3D dental model to form a modified 3D dental model 107. This process may be repeated to include eruption compensation region for all of the erupting teeth. Optionally, the scaled virtual tooth may be further modified to reduce the region of the tooth that is within the gingiva and not visible as crown (e.g., above the gingival marginal line) so that the root or sub-gingival region of the scaled virtual tooth model, once added to the 3D dental model, does extend laterally out of the gingival region in the 3D model. Although this may not effect the ability of the modified 3D model to generate one or more orthodontic appliances and/or treatment plans, it may improve the appearance of the modified 3D dental model and make the model more acceptable for the user, e.g., enhancing adoption of the modified 3D dental model by the user.

Thus, the shape or geometry of an EC region (and resulting EC feature) may be determined based on an asymmetric scaling process whereby different scaling factors are applied to different regions (e.g., buccal side, lingual side, crown portion, root portion, etc.) of the predicted geometry of the unerupted or partially erupted tooth. The scaling factor may be dynamically determined based on avoiding collision with one or more other teeth, such as a tooth on the opposing jaw of the subject when biting. Such a scaling approach may better account for the possibility of the unerupted or partially erupted tooth erupting out of place in relation to the dental arch. Note that although the examples described above scale the tooth model, in some cases the EC feature may be directly scaled instead of, or in addition to, scaling the virtual tooth model.

In some examples, the scaling operation for determining the geometry of the EC region may be performed before, after or during any number of computational operations. In some examples, the scaling operation may be performed during a porting operation. A porting operation may be performed between a DDT process and a setup and stage (S&S) process. The porting operation may involve converting a "bite" file that includes all the information (e.g., segmented information) about scanned objects to "cut" and "cut_painted" files that include only information needed for further S&S processing for the treatment planning. The porting operation may be performed locally (e.g., on a CAD designer's computer) or remotely (e.g., via cloud networking). Alternatively or additionally, scaling and EC region formation may be implemented in the treatment planning process, in the fabrication (FAB) process, in related fabrication (DFAB) process and/or in a clinical check (Clin-Check) process flow.

The modified 3D dental model, including the EC region (modeling the laterally-expanded region for the predicted erupting tooth) may then be used to design one or more dental appliances (e.g., aligners, palatal expanders, retainers, etc.) 108. In some examples the one or more dental appliances may be designed as part of an orthodontic/dental treatment plan, including a treatment plan for moving teeth. For example one or more treatment plans are generated using the 3D dental model with the one or more EC regions. The treatment plan may be designed to reposition the subject's teeth from an initial arrangement (e.g., before treatment has begun or mid-treatment when the treatment plan is adjusted) toward a final arrangement representing a desired configuration of the subject's teeth. The treatment plan may be partitioned into multiple intermediate stages where each stage is associated with incrementally moving the teeth until the final tooth arrangement is achieved. The treatment plan may be represented by 3D models of the subject's dentition at each stage of the treatment plan. For example, each stage of the treatment plan may be associated with a first intermediate 3D model representing the dentition at the beginning of the treatment stage and second intermediate 3D model representing the dentition at the end of the treatment stage. The treatment plan, including the intermediate 3D models for each stage, may be calculated using dental planning software. The one or more EC regions of the 3D model may be integrated into the treatment planning. For example, the treatment plan may accommodate the one or more EC regions (representing one or more erupting teeth) when generating the stages of the treatment plan.

At 109, the treatment plan may be used to generate instructions for fabricating one or more dental appliances (e.g., aligners). Typically, each stage of the treatment plan is associated with one dental appliance. For example, a treatment plan that includes 25 stages may involve the use of 25 dental appliances. A dental appliance associated with a particular stage of the treatment plan is configured to move the teeth from a first arrangement at the beginning of the particular stage toward a second arrangement at the end of the particular stage. The dental appliances may be configured to be worn by the subject sequentially according to the sequence of stages of the treatment plan.

One or more dental appliances may be fabricated based on the generated instructions 111. The dental appliances may include shell aligners that are made of thin shell of polymer material having resilient properties that generally conforms to the subject's teeth but are slightly out of alignment with a current tooth arrangement, thereby applying resilient repositioning forces on the teeth. The aligners may include cavities that are shaped and sized to receive and reposition a subject's teeth when worn on the subject's dental arch. One or more aligners of the series of aligners may include one or more EC features corresponding to the one or more EC regions of the virtual 3D model from which the shapes of the aligners are based on. In addition to accommodating the erupting tooth, in some examples, the EC feature may be sized to accommodate other objects around the erupting tooth (e.g., adjacent teeth, gingiva, teeth of the opposing jaw, the tongue of the subject, etc.).

In some cases, an EC feature corresponds to a cavity in the aligner, similar to the cavities for accepting the existing teeth in the dentition but configured to engage with the erupting tooth. The cavity may have a tooth-like shape similar to the predicted shape of the erupting tooth. Alternatively, the EC feature may correspond to a bubble-like feature, e.g., have a smoother outer shape (e.g., rounded or hemispherical) compared to a tooth-like shape.

The dental appliances may be fabricated using any of a number of manufacturing techniques and/or processes. In some examples, the dental appliances include polymeric shell aligners. In some examples, the dental appliances are made using one or more molding processes (e.g., thermoforming). In some examples, the dental appliances are made using one or more additive manufacturing processes (e.g., 3D printing, material jetting, vat polymerization, material extrusion, etc.).

The size, shape, location and/or orientation of an EC region (and resulting EC feature) may be determined based on a predicted size, shape, location and/or orientation of the erupting tooth at different stages of the treatment plan. This can be estimated, for example, using data about other teeth in the subject's dentition. For example, data about one or more teeth adjacent to the unerupted or erupting tooth and/or an opposing tooth (i.e., a tooth on the opposing jaw of the subject that may interact with the unerupted or erupted tooth) may be used to predict the size, shape, location and/or orientation of the unerupted or erupting tooth. Alternatively or additionally, the geometry (e.g., size, shape, location and/or orientation) of the unerupted or erupting tooth may be predicted based on the geometry (e.g., size, shape, location and/or orientation) of the same type of tooth in the dentition as the unerupted or erupting tooth (e.g., canine, premolar, incisor, etc.). Alternatively or additionally, the geometry (e.g., size, shape, location and/or orientation) of the unerupted or erupting tooth may be predicted based on data related to teeth of other subject cases, pontic galleries and/or typodonts.

In some examples, a predicted characteristic, such as the predicted orientation of the erupting tooth may be made more precise using additional information from the subject. For example, if the crown and/or root of the erupting tooth is visible from the image(s) (e.g., collected using infrared, visible light, ultraviolet and/or x-rays) of the subject's teeth, this information may be used as a predictor of the orientation of the crown of the erupting tooth. The long axis of the erupting tooth may be measured in the plane of the image(s).

In another example, one or more characteristics (e.g., orientation) of the erupting tooth may be predicted based on whether the crown of the erupting tooth or the root is visible from the output of a 3D scanning technique, such as Cone Beam Computed Tomography (CBCT). For example, the long axis orientation of the erupting tooth may be measured in three dimensions relative to one or more adjacent neighboring teeth.

Once the size, shape, location and/or orientation of the unerupted or partially erupted tooth is predicted, a geometry of the EC region within the 3D dental model may be calculated. This 3D dentition with the EC region may then be used as a basis for forming one or more dental appliances with EC feature(s) (e.g., cavities) having geometries corresponding to the EC region. Examples of previous methods and systems for determining a geometry of a cavity for accommodating an erupting tooth are described in U.S. Pat. No. 10,537,405, which is incorporated by reference herein in its entirety. The systems and methods described herein may be used to calculate an improved EC region compared to previous systems and methods, resulting in an improved EC feature in a dental appliance. As described herein, the improved methods and systems may result in dental appliances with improved fit, especially in cases where a tooth is erupting out of place in relation to the jaw arch.

FIG. 2A shows three graphs 201, 203 and 205 illustrating two example methods of calculating an EC region. In each of the graphs 201, 203 and 205, the x-axis represents the buccal-lingual axis, the y-axis represents a height above a gingival edge 209 (i.e., gum line or edge), and the dotted line 207 represents a crown center line (with "B" representing a buccal side and "L" representing a labial side). Graph 201 illustrates a predicted geometry of an unerupted or partially erupted tooth. Graph 203 illustrates a geometry of an EC region calculated using a symmetric scaling factor, whereby the predicted geometry of graph 201 is scaled to the same extent on the buccal and lingual sides. That is, a single scaling factor is applied to the predicted geometry of graph 201 along the buccal-lingual axis. Graphs 205 illustrates a geometry of an EC region calculated using an asymmetric scaling factor, whereby different scaling factors are used to scale up the buccal side of the predicted geometry of graph 201 compared to the lingual side of the predicted geometry of graph 201. That is, a first scaling factor is applied to the buccal side of the predicted geometry of graph 201 and a second scaling factor (different than the first scaling factor) is applied to the lingual side of the predicted geometry of graph 201 along the buccal-lingual axis. In the example of graph 205, the second scaling factor applied to the lingual side is larger than the first scaling factor applied to the buccal side. As described herein, applying an asymmetric scaling factor (e.g., graph 205) may be used to form a dental appliance having a correspondingly shaped EC feature that may accommodate eruption of the unerupted or partially erupted tooth, even if it erupts out of the dental arch.

FIGS. 2B-2D show example virtual 3D models (e.g., as part of a graphical user interface (GUI)) of an unerupted or partially erupted tooth 202 with different associated EC regions. The geometry (e.g., size, shape, location and/or orientation) of the tooth 202 may be predicted based on data about one or more other teeth in the dentition (e.g., one or more adjacent teeth, opposing tooth and/or same tooth type), data related to teeth of other subject cases, pontic galleries, typodonts, among other resources, as described herein. In these examples, the virtual models include crown and root portions of the tooth models, with a gingival edge 210 approximating the location of the gumline. In these examples, the gingival edge 210 is represented by an edge with spherical ball that extends around the tooth 202 in a transverse plane. The tooth 202 has a labial side 202L, a buccal side 202B with respect to a crown centerline of the tooth 202 along a buccal-lingual axis of the tooth 202.

FIG. 2B shows an example of an EC region 234 that is calculated using a symmetrical scaling process. The geometry of the EC region 234 is determined by applying a single scaling factor to the predicted geometry of the tooth 202 along the buccal-lingual axis. Thus, the same scaling factor is applied to the labial side 202L as the buccal side 202B of the tooth 202 to define a labial side 234L and a buccal side 234B of the EC region 234.

FIG. 2C shows an example of an EC region 244 that is calculated using an asymmetrical scaling process. The geometry of the EC region 244 is determined by applying a first scaling factor to the labial side 202L of the tooth 202 and a second scaling factor to the buccal side 202B of the tooth 202, where the first scaling factor is different than the second scaling factor. Thus, the EC region 244 has a labial side 244L and a buccal side 244B defined by different scaling factors relative to the tooth 202.

FIG. 2D shows a comparison of the EC region 234 formed using the symmetric scaling process versus the EC region 244 formed using the asymmetric scaling process. In this example, the buccal side 244B of the EC region 244 is scaled to the same extent as the buccal side 234B of the EC region 234. However, the lingual side 244L of the EC region 244 is scaled to a greater degree than the lingual side 234L of the EC region 234. This increased size of the labial side 244L of the EC region 244 increases an ability of a resulting dental appliance to accommodate the tooth 202 if it erupts labially with respect to the dental arch compared to a dental appliance formed using the EC region 234.

Any of a number of factors may be used to determine whether to apply a larger scaling factor on the lingual side or the buccal side of a tooth. For example, statistical analysis of clinical data collected from a number of subjects may show a tendency of unerupted or partially erupted teeth to erupt on a labial side or a buccal side of the dental arch. In one example, statistical data show a tendency for teeth to erupt on a labial side of the dental arch; thus, a larger scaling factor is applied to the labial side compared to the buccal side of the predicted tooth model (such as in the examples of FIGS. 2A-2D). Alternatively or additionally, data specific to the subject's dentition (e.g., location, size and/or orientation of other teeth) may be used to predict whether the unerupted or partially erupted tooth will on the labial side or the buccal side of the subject's dental arch.

In some examples, the scaling factor may preferentially scale the lingual side of the virtual tooth model corresponding to the erupting tooth. In some examples a dynamic scaling process may be used to determine a magnitude of the larger scaling factor applied to the lingual or buccal side of the predicted tooth model. The dynamic scaling may be based on avoiding expected interactions of the EC feature with other teeth in the subject's dentition over the course of treatment (e.g., accounting for any changes that are expected to occur to the subject's dentition over the course of treatment). For example, the dynamic scaling may involve searching through the virtual dental model to avoid situations where the EC would collide with one or more other teeth during the course of treatment. Such searching may include considering the position of the teeth when the upper and lower jaws are in a bite configuration, and avoiding collision with one or more teeth of the jaw opposite the jaw with the erupting tooth. Such searching and dynamic scaling can provide a reliable solution for determining a shape that reserves enough space for the erupting tooth compared to previous scaling methods, while not adversely affecting the treatment or the subject's comfort. Alternatively or additionally, the scaling factor may be limited to being within a maximum threshold value associated with an unnatural feel or appearance of the EC feature.

In some cases, a root adjustment process is applied to EC region to compensate for an undesirably large root portion as a result of the asymmetric scaling process. To illustrate, FIGS. 3A-3B and 4A-4B show examples of the EC regions 234 and 244 in a dental model 300. The virtual models of FIGS. 3A-3B and 4A-4B may be displayed as part of a GUI.

Figure 3B:
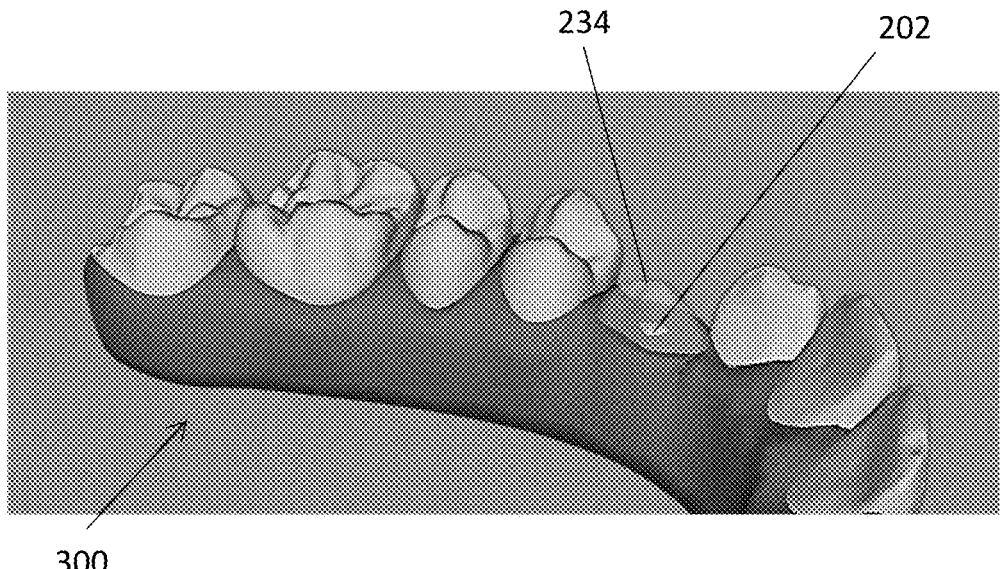

FIGS. 3A-3B show the EC region 234 formed using a symmetric scaling process in the dental model 300. As discussed above, the EC region 234 was formed using the same scaling factor applied to lingual and buccal sides of the predicted geometry of the unerupted or partially erupted tooth 202. The EC region 234 may not adequately accommodate the tooth 202 if it were to erupt ectopically (e.g., on the lingual side) with respect to the dental arch of the dental model 300.

Figure 4A:
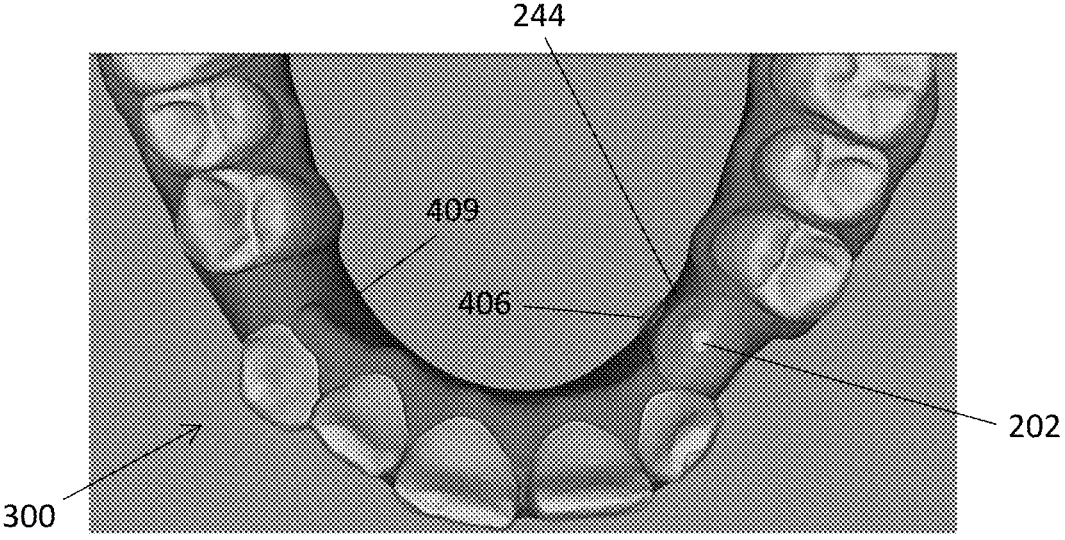
FIGS. 4A-4B illustrate example aerial and perspective views, respectively, of the EC region of FIG. 2C formed using an asymmetric scaling process incorporated in a dental model.
Figure 4B:
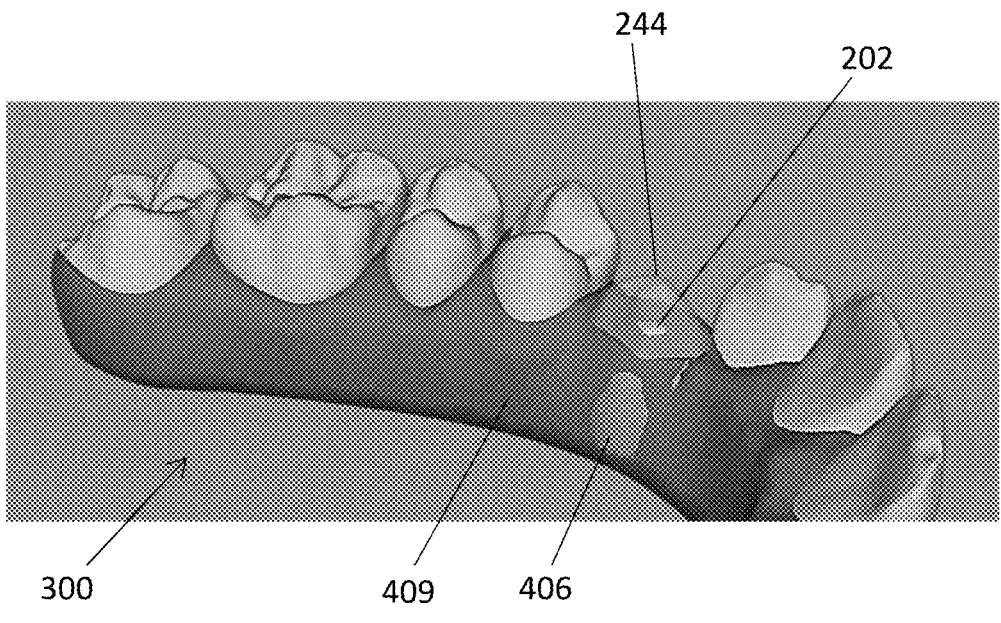

FIGS. 4A-4B show the same dental model 300 with the EC region 244 formed using an asymmetric scaling process, where a larger scaling factor is applied to lingual side of the tooth 202 compared to the buccal side of the tooth 202. As shown, a root portion 406 of the EC region 244 extends lingually past the gingiva 409 of the dental model 300. This is because the relatively large lingual side of the EC region 244, which is configured to accommodate the tooth 202 as it erupts (and if it erupts on the lingual side of the dental arch), has a corresponding large root portion 406 due to the asymmetric scaling. This may make the virtual dental model 300 look unnatural and/or confuse the user (e.g., dental practitioner). Since the root portion 406 is below the gingival edge of the EC region 244, it does not impact the formation of an EC feature of the dental appliance. Thus, in some examples, the shape of the root portion 406 is modified to provide a more natural appearance to the virtual dental model 300.

FIGS. 5A-5C show example virtual 3D models (e.g., as part of a graphical user interface (GUI)) of an EC region 544 after a root modification is applied to the EC region 244. FIG. 5A shows the root portion 544R of the EC region 544 having a reduced size so as to remain within the gingiva of the dental model. In this example, the modification involves extensively reducing the width of an apex of the root portion, while maintaining a width of a region of the root portion near the gingival edge 209, thereby providing a root portion 544R having a tapered shape.

The root portion of the virtual tooth model (e.g., the sub-gingival region) may be modified in any appropriate manner to prevent it from extending from out of the side (e.g., laterally) of the gingiva in the modified 3D dental model. In some examples the root portion may be configured to taper as it extends away from the crown region. In some examples it may be truncated.

FIG. 5B compares the EC region 544 with the EC region 244 prior to root modification. As shown, the modified root portion 544R is smaller in width along the buccal-lingual axis compared to the root portion 244R prior to modification, while the crown portion 544C of the EC region 544 remains unchanged in relation to the root portion 244R prior to modification.

FIG. 5C compares the EC region 544 with the EC region 234 that was calculated using symmetric scaling. Because of the asymmetric scaling, the labial side 544L of the EC region 544 is larger than the labial side 234L of the of the EC region 234. In addition, because of the root modification, the root portion 544R of the EC region 544 is smaller than the root portion 234R of the of the EC region 234.

Figures 6A, 6B:
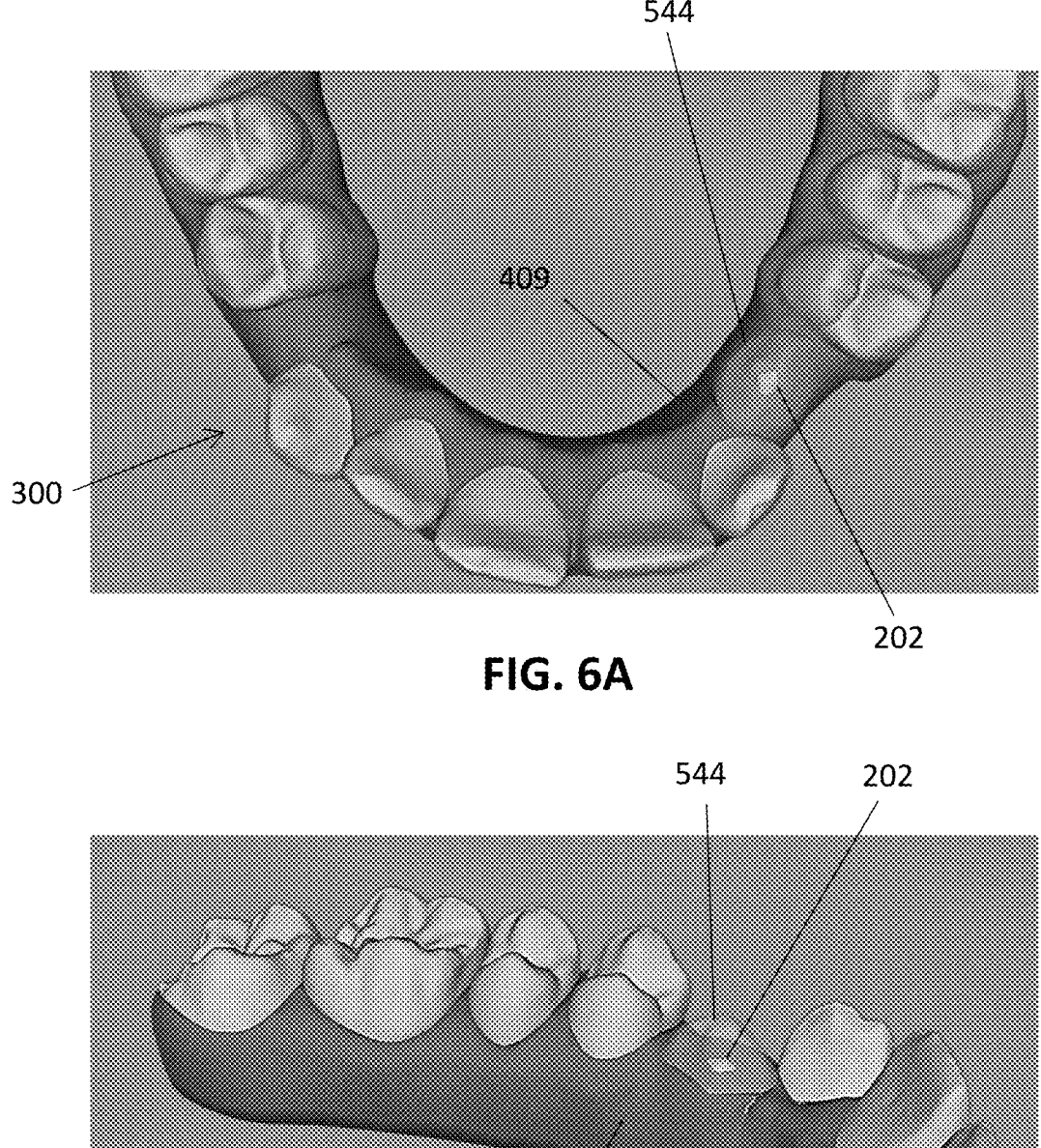
FIGS. 6A-6B illustrate example aerial and perspective views, respectively, of the EC region of FIG. 5A formed using an asymmetric scaling and root modification processes incorporated in a dental model.

FIGS. 6A-6B show the virtual dental model 300 with the EC region 544 formed using the symmetric scaling process and the modified root process. As shown, the EC region 544 has a relatively large labial side to accommodate possible eruption of the tooth 202 toward the labial side of the dental arch. In addition, the EC region 544 has a reduced root portion that does not penetrate through the outer surface of the gingiva 409 of the virtual dental model 300. In some cases, the asymmetric dynamic scaling operation may be applied to the predicted geometry of the erupting tooth automatically. In some cases, one or more aspects of the asymmetric dynamic scaling operation are user selected. For example, the user may select whether to apply the larger scaling factor on the lingual or buccal side and/or a scaling ratio that is applied.

Figure 7A:
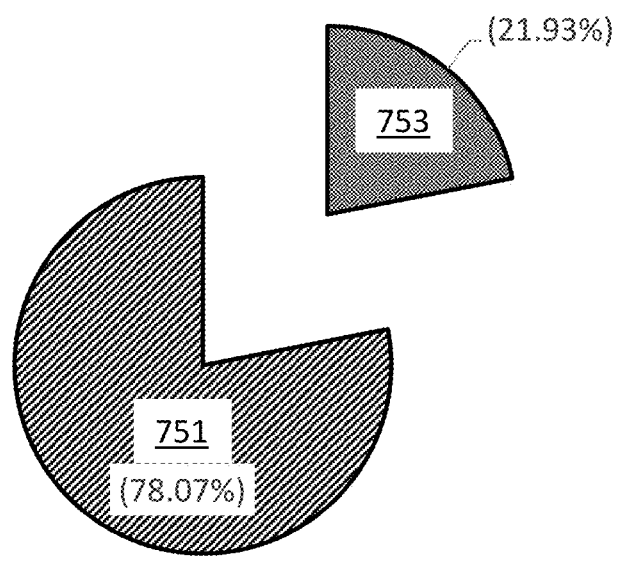
FIGS. 7A-7B are charts illustrating the percentage of real subject dentitions in which lingual asymmetric scaling processes were successfully implemented.

As mentioned above, the methods an apparatuses (e.g., systems, devices, etc.) described herein may be used to preferentially enlarge (scale) the lingual side of a virtual tooth model corresponding to an erupting tooth that is added to a 3D dental model of the subject's dentition. In general, asymmetrically scaling/enlarging the lingual side more than the buccal side (see, e.g., FIG. 2A-2C) as described herein may result in fewer collisions with the adjacent and opposite teeth, e.g., in the upper jaw. For example, FIG. 7A is a chart representing the percentage of cases in which an EC buccal-lingual (BL) scaling process was successfully implemented. The data is based on virtual dynamic modeling using real subject dentitions in which an EC region having an asymmetrically large lingual EC feature (similar to one formed using the EC region 544 discussed above) was either success applied 751 or unsuccessfully applied 753. As shown, the EC asymmetric scaling process was successfully applied to 78.01% of the cases because there was no opposing tooth collision, and unsuccessfully applied to 21.93% of the cases due to opposing tooth collision. Of the 21.93% of cases in which symmetric EC scaling were not successful, collision may also have likely occurred if preferentially scaling/enlarging the buccal side.

Figure 7B:
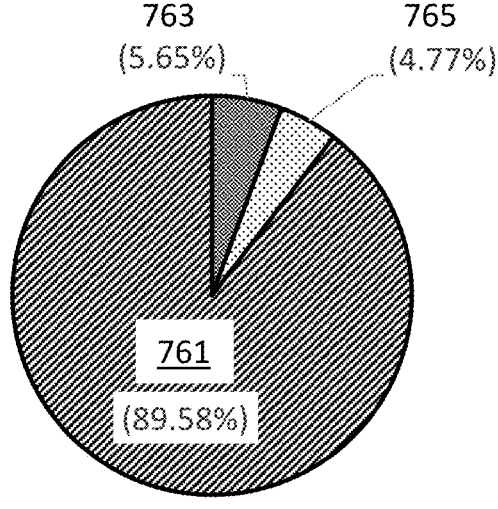

As discussed above, the scaling factor for enlarging the lingual side (relative to the buccal side) may preferentially be between 1.1 and about 1.3. FIG. 7B is a chart representing the percentage of successfully applied eruption compensation lingual scaling using different scaling factors (e.g., 1.3, 1.2, 1.1). The data is based on virtual dynamic modeling using real subject dentitions in which an EC region has an asymmetrically scaled lingual EC feature. In FIG. 7B, the percentage of cases that were successfully applied using a scaling factor of 1.1 (5.65%) 763, using a scaling factor of 1.2 (4.77%) 765, and using a scaling factor of 1.3 (89.58%) 761 are shown. The scaling factor was limited to a maximum of about 1.3 to avoid an unnaturally large shape of the EC region on the lingual side and to prevent a resulting uncomfortable feeling for the subject, although in theory larger scaling factors could be applied (e.g., 1.35, 1.4, 1.45, 1.5, etc.); thus the scaling factor may be between about 1.1 and about 1.2, between 1.1 and about 1.3, between 1.1 and about 1.35, between 1.1 and about 1.4, between 1.1 and about 1.45, between 1.1 and about 1.5, etc.). The data in FIG. 7B indicates that a scaling factor of 1.1 was successfully applied to 5.65% of the cases, a scaling factor of 1.2 was successfully applied to 4.77% of the cases, and a scaling factor of 1.3 was successfully applied to 89.58% of the cases. Thus, in most cases, the biggest ratio is applicable, and less than 10% of cases have a lower scale than the maximum one.

FIG. 8 schematically indicating an example of a method (e.g., process) for forming an EC region and EC feature using scaling as described herein. At 801, a determination is made that a subject has an unerupted or partially erupted tooth. Such a determination may be made, for example, during a clinical examination (e.g., visual inspection gingival palpation) and/or review of one or more images of the subject's dentition. The images of the subject's dentition may be obtained, for example, by scanning the subject's teeth using an intraoral scanner, CBCT scan, X-ray, etc. In some examples, a scanner (e.g., intraoral scanner) is configured to obtain images of the unerupted or partially erupted tooth within the gingiva. For example, the scanner may be configured to direct and receive certain wavelengths of radiation (e.g., infrared, visible light, ultraviolet, x-rays and/or tomography) capable of obtaining surface images and/or images through the gingiva.

If one or more unerupted or erupting teeth (collectively referred to herein as an "erupting tooth") are present, the method or apparatus may then generate a virtual tooth model corresponding to the erupting tooth. The virtual tooth model may be initially generated by any appropriate manner 803 and may be modified, e.g., scaled, as described herein. For example, an initial virtual tooth model corresponding to the erupting tooth may be generated using the known dimensions of adjacent, opposing and/or counterpart teeth are received; in some examples these dimensions may be used to select an initial virtual tooth model from a library of virtual tooth models based on the dimensions of the unerupted tooth (e.g., from one or more penetrative scans), and/or known dimensions of adjacent, opposing and/or counterpart teeth. For example, the one or more images of the subject's dentition may be analyzed to determine at least one dimension (e.g., X, Y, and/or Z dimension data in a 3D coordinate system) of the counterpart, adjacent, and/or opposing teeth.

Characteristics (e.g., size, shape, location, and/or orientation) of the unerupted or partially erupted tooth as it is erupting may therefore be predicted 805. For example, data from the images of the subject's dentition may be used for one or more calculations to predict the dimension of the tooth once partially or completely erupted. For example, the dimensions of one or more the counterpart, adjacent, and/or opposing teeth may be used to predict dimensions of the erupting tooth. In some examples, a multivariate regression model (or other suitable model) may be used to further refine the dimension of the erupting or unerupted tooth. This type of model can, for example, be used where there are multiple adjacent, opposite, or counterpart teeth that are being used in such analysis. In some examples, the counterpart, adjacent, and/or opposing teeth used in the regression model are identified and selected (e.g., automatically or user-selected).

Alternatively or additionally, one or more standard virtual geometry and/or pre-defined virtual geometry (e.g., from a pontic gallery, partially erupted or fully erupted counterpart tooth) dimension may be used to predict the characteristics of the unerupted or partially erupted tooth as it is erupting. In some cases, this may involve comparing and matching characteristics of the unerupted or partially erupted tooth and/or other teeth in the dentition with characteristics (e.g., size, location, shape, and/or orientation) of a tooth typodont, pontic gallery or a standard virtual geometry.

Thus, the initial virtual tooth model may be generally scaled and positioned within the 3D dental model of the dentition, once characteristics (e.g., size, shape, location, and/or orientation) of the erupting tooth is predicted 807. In some examples the intermediate tooth model may be asymmetrically scaled as described above, e.g., to preferentially enlarge the lingual side of the virtual tooth model, or to preferentially adjust the scaling factor in the buccal-lingual direction, the mesial distal direction, the proximal direction, etc. Asymmetric scaling may be integrated into the scaling and positioning of the initial virtual tooth model, or it may be separately performed. As discussed, the asymmetric scaling process may apply different scaling factors to lingual and buccal sides of the predicted geometry of the erupting tooth (e.g., or may not further scale one side relative to the other).

In any of these examples the lingual and buccal sides of the virtual tooth model corresponding to the erupting tooth may be determined based on a predicted orientation of the erupting tooth in relation to adjacent teeth in the dentition. For example, a crown center line along a buccal-lingual axis of the predicted virtual geometry of the erupting tooth may be defined based on the predicted orientation of the erupting tooth.

In some cases, a larger scaling factor is automatically applied to either the lingual side or the buccal side of the virtual tooth model corresponding to the erupting tooth. In some examples the scaling factor may be greater than 1 for one side (e.g., the lingual side) and may be one or less for the other side of the virtual tooth model (e.g., the buccal side). The magnitude of the scaling factor applied, e.g., to the lingual side, may be determined based on clinical data (e.g. of subjects having similar clinical conditions) and may be pre-determine based on an estimate that the tooth is more likely to erupt lingually or buccally in relation to the dental arch. In cases where the clinical data showed that the tooth is more likely to erupt lingually, a larger scaling factor may be applied (e.g., automatically) to the lingual side of the predicted geometry of the erupting tooth. The scaling factor may be set as the largest practical scaling factor (e.g., 1.3, 1.35, 1.4, etc.). Likewise, in cases where the clinical data showed that the tooth is more likely to erupt buccally, a larger scaling factor may be applied (e.g., automatically) to the buccal side of the predicted geometry of the erupting tooth. In other cases, the user (e.g., dental practitioner) may select which side (lingual or buccal) of the predicted geometry of the erupting tooth that a larger scaling factor will be applied. In some examples the asymmetrical scaling process for scaling the virtual tooth model corresponding to the erupting tooth may be based on the positions of one or more other teeth in the subject's dentition. For example, the size and/or shape of the virtual tooth model (and therefore the size of the EC region) may be automatically limited based on avoiding collision with one or more teeth on the jaw opposite of the erupting tooth, as discussed herein. For example, the scaling factor may be adjusted based on avoiding collision with one or more teeth.

Once the size, shape, location and/or orientation of the virtual tooth model corresponding to the erupting tooth is determined, the virtual tooth model may be added to the 3D dental model to form a modified 3D dental model that includes an EC region based on the scaled virtual tooth model corresponding to the erupting tooth 808. This modified 3D dental model may then be used to generate one or more dental appliances (e.g., aligners, retainers, palatal expanders, etc.) 809. In some examples the modified 3D dental model with the incorporated EC region may be used to generate a treatment plan for treating the subject's dentition. For example, a treatment planning software program may use virtual dental models of an initial tooth arrangement (e.g., prior to treatment or prior to mid-course correction) and a final tooth arrangement (e.g., desired tooth arrangement) to generate a series of intermediate tooth arrangements that incrementally move the teeth from the initial to the final tooth arrangement. Each of the intermediate tooth arrangements may be associated with a corresponding dental appliance (e.g., aligner) for implementing the incremental tooth movements. The series of dental appliances (e.g., aligners) can be sequentially worn by the subject over a treatment period of time to implement the treatment plan.

Thus, the EC region may be incorporated in one or more of the initial, intermediate and/or final dental models. In some cases, the EC region may be incorporated in all the dental models and therefore dental appliances formed by the dental model(s). In some cases, the EC region is incorporated in the dental model(s) in which the tooth is expected to erupt. In some cases, there may stages of the treatment plan in which there is not be enough space between neighboring teeth to accommodate the EC region. In such cases, the dental planning software may calculate at which point during treatment there is enough space between neighboring teeth and incorporate the EC region at that point of treatment. In some cases, the EC regions in different dental models may have different shapes and sizes to accommodate different states of possible eruption of the tooth. For example, a first dental model associated with a first stage of the treatment plan may include a first EC region having a first size, and a second dental model associated with a second stage of the treatment plan may include a second EC region having a second size that is different (e.g., larger) than the first size.

Any of these methods and apparatuses may be configured to generate plans (e.g., designs, including but not limited to design files, instructions, or the like) for forming one or more dental appliances based on the modified 3D dental model including the EC region (e.g., including the scaled virtual tooth model incorporated into the 3D dental model) 809. These plans may then be used to form one or more virtual dental appliances 811. For example, these methods may be configured to generate a series of virtual dental appliances corresponding to the series of dental models that are formed. In some examples, the virtual dental appliances are virtual shell aligners with multiple cavities for accepting the teeth of the virtual dental models. The shapes of the cavities (e.g., walls defining the cavities) may be configured to apply prescribed forces on the dental model to move the teeth according to corresponding stages of treatment. For example, a first virtual aligner may have cavities shaped to apply a first set of repositioning forces on the teeth toward tooth positions of a first intermediate dental model, and a second virtual aligner may have cavities shaped to apply a second set of repositioning forces on the teeth toward tooth positions of a second intermediate dental model.

A dental model that includes one or more EC regions may be used to form a virtual aligner having one or more correspondingly shaped, sized and oriented EC features. In some examples, the EC feature is another cavity in the virtual shell. The EC feature cavity may have a tooth shape according to the predicted geometry of the erupting tooth. However, the EC feature cavity may be larger than the predicted size of the erupting tooth, thereby providing a space between the virtual shell and the erupting tooth so as to avoid contacting the erupting tooth.

A series of dental appliances may be fabricated based on the virtual dental appliances. For example, the dental appliances are made using one or more molding processes (e.g., thermoforming) and/or one or more additive manufacturing processes (e.g., 3D printing, material jetting, vat polymerization, material extrusion, etc.).

Figure 9:
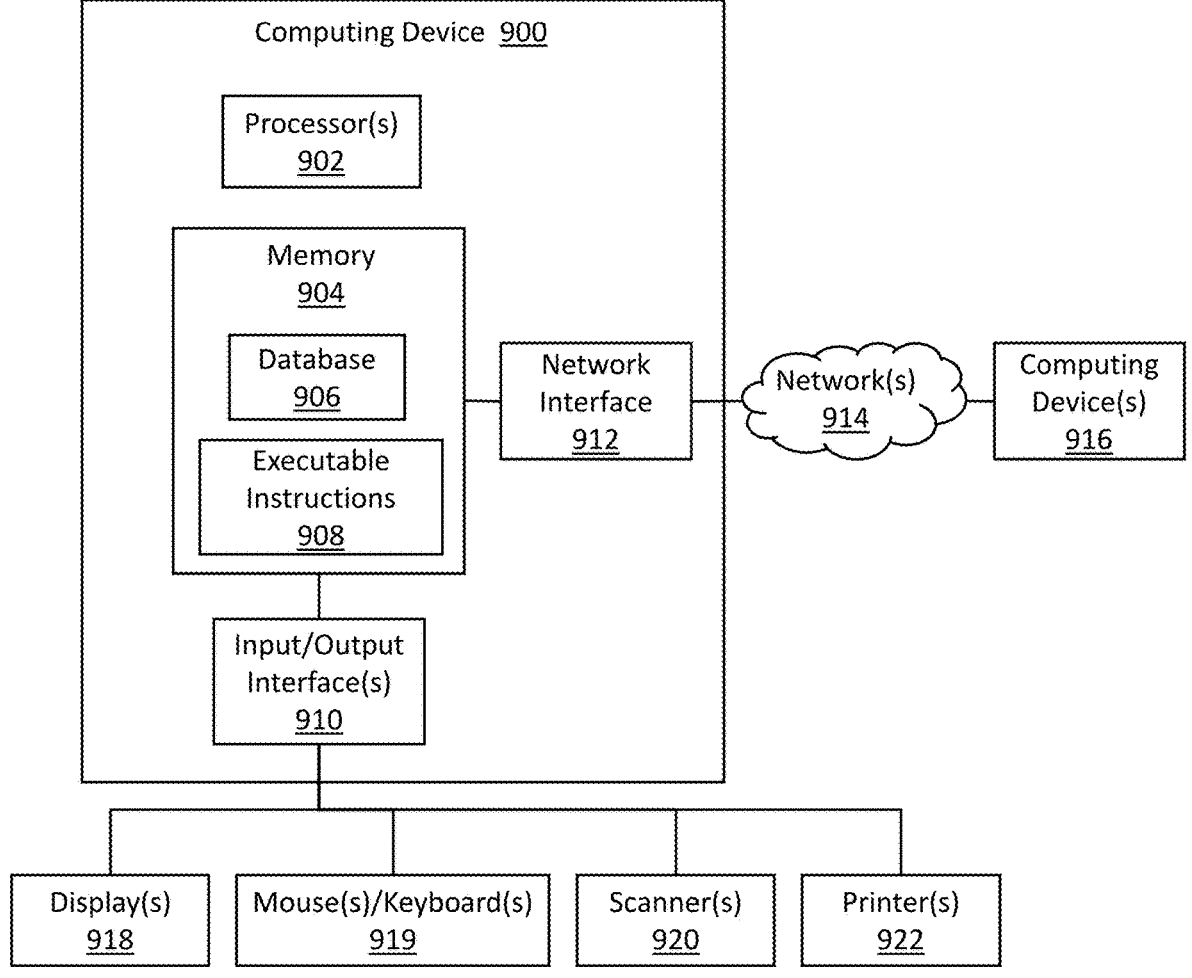
FIG. 9 illustrates an example system for treatment planning.

FIG. 9 shows an example system for treatment planning. The system includes a computing device 900 configured to perform one or more of the computer-implemented methods described herein. The computing device 900 includes one or more processors 902 and memory 904. The memory 904 may include various types of information including data 906 and computing device executable instructions 908. For example, the memory 904 may be used to store executable instructions 908 that may be used to interact with the other components of the computing device 900 and/or one or more other computing devices 916 via one or more networks 914 and may be used to store information, such as instructions for manipulating one or more files.

The computing device 900 may include executable instructions 908 for saving a number of program and/or data files, such as files, for providing executable instructions 908 that allow for the viewing functionality for viewing and/or analyzing scans and/or virtual models (e.g., 3D dental models). The computing device 900 may be configured to calculate characteristics (e.g., size, shape, location and/or orientation) of one or more virtual EC regions for accommodating one or more erupting teeth, as described herein. For example, the computing device 900 may be configured to apply asymmetric scaling to a predicted virtual geometry of an unerupted or partially erupted tooth to generate an EC region with a lingual or buccal side that can accommodate a lingually or buccally ectopically erupting tooth.

One or more of the computer-implemented methods described herein may be performed by the computing device 900 and/or by the one or more additional computing devices 916. For example, predictions regarding characteristics (e.g., size, shape, location and/or orientation) of the erupting tooth may be calculated by the computing device 900 and/or by the one or more additional computing devices 916. As another example, segmentation of a 3D dental model (e.g., formed based on collected images of a dentition) may be performed by the computing device 900 and/or by the one or more additional computing devices 916. As a further example, generation of a treatment plan and/or virtual dental appliances may be performed by the computing device 900 and/or by the one or more additional computing devices 916.

The computing device 900 may include a network interface 912. The interface 912 may allow for processing on one or more additional computing devices 916, or the computing devices 916 may be used to transmit and/or receive data (e.g., scans and/or digital models and/or executable instructions) for use with various methods described herein. The network 914 may be any type of network, such as a local network and/or a wide area network. In some examples, the one or more additional computing devices 916 may include those that are associated with one or more manufacturing systems. As described herein, the manufacturing systems(s) may include additive manufacturing equipment (e.g., 3D printer(s)), molding equipment, and/or the like.

In some cases, the computing device 900 device may be part of a scanning system for scanning a subject's oral cavity (e.g., intraoral scanning system). Alternatively, the computing device 900 may be separate from a scanning device/ system. In some cases, the computing device may be part of, or integrated with, dental treatment planning system.

The computing device 900 may include one or more input and/or output interfaces 910. Such interfaces 910 may be used to connect the computing device 900 with one or more input and/or output devices. Examples input and output devices may include one or more displays 918 (e.g., computer monitor or screen), one or more mouses and/or keyboards 919, one or more scanners 920 and/or one or more printers 922.

The one or more scanners 920 may include an intraoral scanner that is configured to collect images of the inside of a subject's mouth. The scanner(s) 920 may include one or more radiation (e.g., visible, infrared, near infrared and/or x rays) sources and one or more sensors/detectors for detecting radiation that is reflected and/or scattered off tissue of the subject's mouth. In some cases, the scanner(s) may include a wand that is shaped and sized to fit at least partially within the subject's mouth. The wand may be configured to direct the radiation into the subject's mouth and collect reflected and/or scattered radiation to collect images of the subject's mouth. In some examples, components of the scanner(s) are controlled by the computing device 900. For example, the executable instructions 908 may be configured to cause the processor(s) 902 to control aspects of image collection of the scanner(s), and the image data may be stored in the memory 904 as data 906. Alternatively, the scanner(s) may be controlled by a computing device separate from the computing device 900. Data from a scan of the subject's teeth may be used to form a digital model (e.g., 3D digital model) of the subject's teeth, which may be used to identify and characterize malocclusions and to use as a basis for generating one or more treatment plans, as described herein.

The one or more printers 922 may include one or more 3D printers configured to fabricate dental appliance(s), such as polymeric aligners, based on one or more treatment plans. Alternatively or additionally, the one or more printers 922 may include one or more ink-based printers that is/are configured to print images and/or text on paper or other material.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

Figure 10:
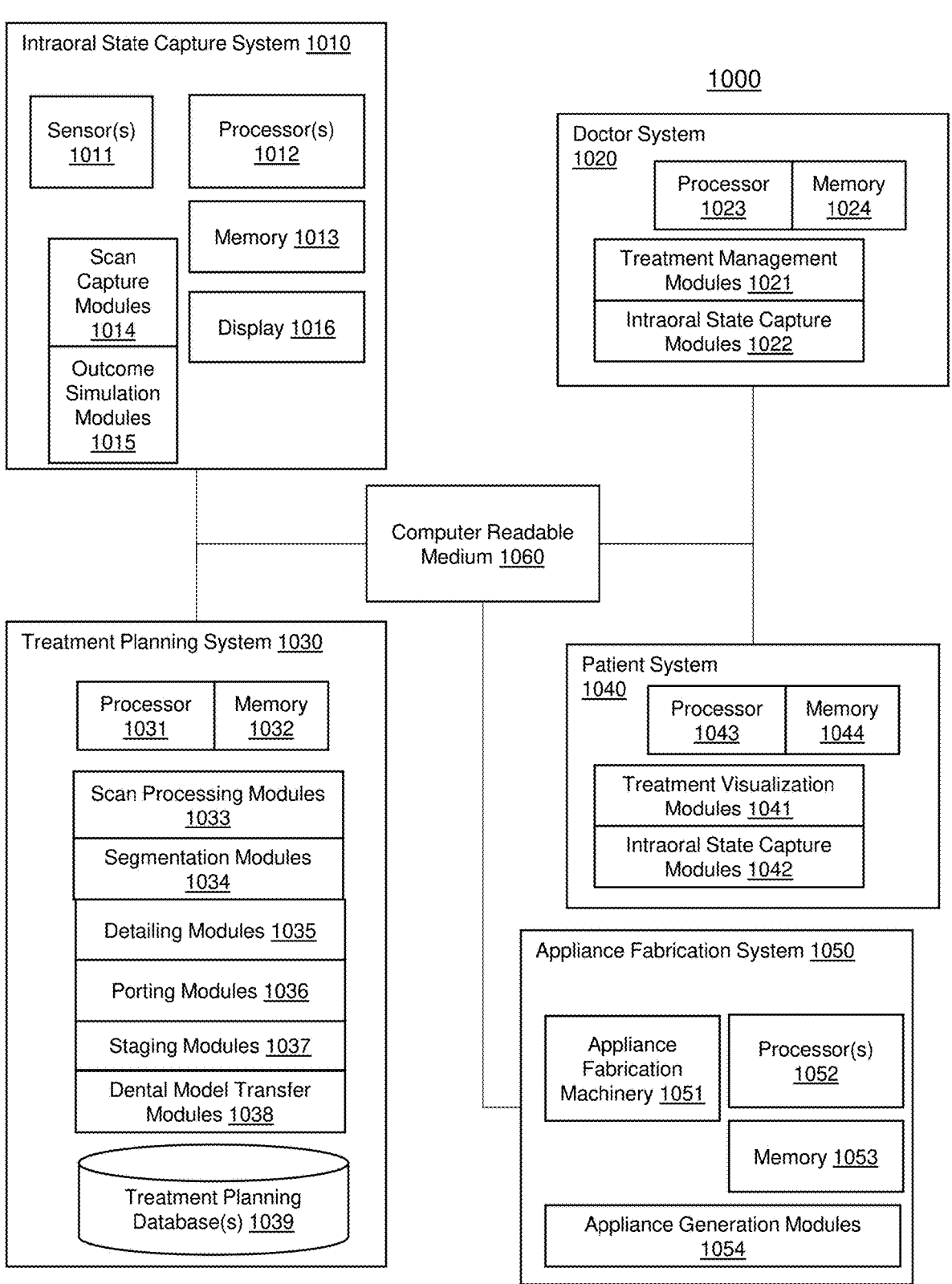
FIG. 10 schematically illustrates an example of a computing environment including the apparatus as described herein.

The methods and apparatuses described herein may be used as part of a dental treatment planning system and/or method. For example, FIG. 10 illustrates a system 1000 for appliance fabrication using digital treatments planned using information captured from the physical world using an intraoral scanning system 1010. In the example of FIG. 10, the system 1000 may include sub-systems (also referred to herein as systems), including an intraoral state capture system 1001, doctor system 1020, treatment planning system 1030, patient system 1040, appliance fabrication system 1050, and computer-readable medium 1060. Any or all of the elements of system 1000 can include components of a computing device, such as computing device 900 shown in FIG. 9 and discussed in more detail herein. It is noted that some or all of the components of computing device 900 need not reside on an element of system 1000. It is noted that any or all modules shown on FIG. 10 can contain computer-program instructions, that when executed by processor(s) on a respective device, can cause the device to perform one or more functionalities related to getting a digital representation of a person's dentition, digitally planning a treatment for dentition, and/or designing and/or fabricating appliances to implement a digital treatment plan on a person's dentition.

In the example of FIG. 10, the intraoral state capture system 1010 can include any computing device with components that operate to capture the state of a person's oral cavity. The intraoral state capture system 1010 can include sensor(s) 1011, processor(s) 1012, memory 1013, scan capture modules 1014, outcome simulation module(s) 1015, and display(s) 1016. One or more of sensor(s) 1011, processor(s) 1012, memory 1013, scan capture modules 1014, outcome simulation module(s) 1015, and display(s) 1016 can be coupled to one another and/or to elements not explicitly shown. As an example, one or more of sensor(s) 1011, processor(s), and display(s) 1016 can be coupled to a computer-readable medium that resides on intraoral state capture module 1010, computer-readable medium 1060, or some other element to facilitate storage and/or transfer of data.

Sensor(s) 1011 can include a device(s) that detect and/or respond to a stimulus from the physical environment. Examples of sensor(s) 1011 include camera(s); devices that sense pressure, temperature, displacement, etc.; devices that detect radiation (radiography sensors, tomography sensors, etc.); etc. Sensor(s) 1011 may include one or more lenses and optical sensors to capture reflected light, particularly from a patient's dentition.

Processor(s) 1012 can include physical processor(s) as described herein. Memory 1013 can include device(s) to store data or programs (sequences of instructions) on a temporary or permanent basis for use in an electronic digital computer, as described further herein. Scan capture modules 1014 can include one or more computer-program instructions operative, when executed by processor(s) 1012, to capture a state of a person's oral cavity. Scan capture modules 1014 can include computer-program instructions to stitch, mesh, and/or combine information from sensor(s) 1011 into a representation of a person's dentition. Outcome simulation module(s) 1015 can include one or more computer-program instructions operative, when executed by processor(s) 1012, to display a representation of a person's dentition. Outcome simulation module(s) 1015 can, e.g., display the results of an intraoral scan, results of tomography, radiographs, images of a person's dentition, etc. Display 1016 can include a device to display information captured at the intraoral state capture system 1010. Some or all of intraoral state capture system 1010 can be implemented in, e.g., an intraoral scanner, a laptop, a desktop, a phone, a radiography machine, a tomography machine. Some or all of intraoral state capture system 1010 can be implemented as part of an electronic system on a dental appliance.

In the example of FIG. 10, doctor system 1020 includes treatment management modules 1021, intraoral state capture modules 1022, processor(s) 1023, and memory 1024. Treatment management module 1021 and an intraoral state capture module 1022 may access and/or use the 3D model. The doctor system 1020 may provide a "doctor facing" interface to the computing environment 1000. The treatment management module 1021 can perform any operations that enable a doctor or other clinician to manage the treatment of any patient. In some examples, the treatment management module 1021 may provide a visualization and/or simulation of the patient's dentition with respect to a treatment plan. As an example, treatment management module 1021 can display to a doctor eruption compensation regions and/or allow a doctor the ability to modify these regions. Treatment management module 1021 can allow management, modification, etc. of scaling factors, movement of eruption compensation regions, etc. In any of these methods and systems, the doctor system may include a user interface that includes the option of scaling the EC region, including manually, automatically or semi-automatically scaling. For example, the clinician (e.g., doctor) may be allowed to select scaling of the EC; in some cases the scaling may be indicated as symmetric or asymmetric. The degree of scaling may be manually adjusted (e.g., up/down).

The intraoral state capture module 1022 can provide images of the patient's dentition to a clinician through the doctor system 1020. The images may be captured through the intraoral scanning system 1010 and may also include images of a simulation of tooth movement based on a treatment plan.

In some examples, the treatment management module 1021 can enable the doctor to modify or revise a treatment plan, particularly when images provided by the intraoral state capture module 1022 indicate that the movement of the patient's teeth may not be according to the treatment plan. The doctor system 1020 may include one or more processors configured to execute any feasible non-transitory computer-readable instructions to perform any feasible operations described herein.

In the example of FIG. 10, treatment planning system 1030 includes processor(s) 1031, memory 1032, scan processing modules 1033, segmentation modules 1034, detailing modules 1035, porting modules 1036, staging modules 1037, dental model transfer modules 1038, and treatment planning database(s) 1039. One or more of processor(s) 1031, memory 1032, scan processing modules 1033, segmentation modules 1034, detailing modules 1035, porting modules 1036, staging modules 1037, dental model transfer modules 1038, and treatment planning database(s) 1039 can be coupled to one another and/or to elements not explicitly shown. As an example, one or more of processor(s) 1031, memory 1032, scan processing modules 1033, segmentation modules 1034, detailing modules 1035, porting modules 1036, staging modules 1037, dental model transfer modules 1038, and treatment planning database(s) 1039 can be coupled to a computer-readable medium that resides on treatment planning system 1030 computer-readable medium 1060, or some other element to facilitate storage and/or transfer of data.

Scan processing module(s) 1033 can include computer-program instructions that, when executed by processor(s) 1031, cause treatment planning system 1030 to process a representation of a person's dentition. Scan processing module(s) 1033 can receive meshes, radiographs and/or other representations of a person's dentition. Scan processing module(s) 1033 can further process sensor data indicative of a state of a person's oral cavity. Scan processing module(s) 1033 can process cone beam data (e.g., DICOM data) related to a person's dentition. Segmentation modules 1034 can, e.g., with or without human intervention, include computer-program instructions that, when executed by processor(s) 1031, cause treatment planning system 1030 to segment process a representation of a person's dentition into constituent parts (e.g., teeth, lips, gingiva, other soft tissue). Segmentation modules 1034 can, e.g. assign anatomical identifiers (e.g., tooth numbers or indications of various oral structures) to a representation of a person's dentition. In some implementations, segmentation modules 1034 implement instructions from a person (e.g., a technician) to segment a representation of a person's dentition into constituent parts. In various implementations, segmentation modules 1034 implement instructions to automatically segment (e.g., without human intervention) a representation of a person's dentition into constituent parts. Segmentation modules 1034 can produce an annotated 3D virtual model of a person's dentition.

Detailing modules 1035 can include computer-program instructions that, when executed by processor(s) 1031, cause treatment planning system 1030 to identify and/or correct errors in a 3D virtual model of a person's dentition. In some implementations, detailing modules 1035 can identify and/or correct scan errors, segmentation errors, and/or other errors in a 3D virtual model of a person's dentition. Porting modules 1036 can include computer-program instructions that, when executed by processor(s) 1031, cause treatment planning system 1030 to transition a 3D virtual model of a person's dentition to a format desirable for treatment planning. Porting modules 1036 can associate attributes of a 3D virtual model with a prescription form for a user of treatment planning system 1030 and/or doctor system 1020. Porting modules 1036 can implement instructions to remove unnecessary items from a 3D virtual model.

In some implementations, porting modules 1036 can implement instructions to identify areas of erupting dentition and can reinsert eruption compensation areas into relevant areas of erupting dentition. As an example, porting modules 1036 can identify regions where a primary tooth is likely to exfoliate through the course of a treatment plan. E.g., porting modules 1036 can determine whether spacing between two teeth in an arch exceeds a distance threshold (e.g., 1 mm, 3 mm, 5 mm, 7 mm, etc.). If spacing between two teeth in arch exceeds a distance threshold, an eruption compensation region can be defined. Porting modules 1036 can indicate areas of erupting dentition in a prescription form. Porting modules 1036 can provide a geometry of an eruption compensation (EC) region using the techniques herein.

For example the portion module, or a separate module, may be configured to determine the EC region (e.g., using an EC region generating module) based on a prediction of the erupting/ectopic tooth, and may scale the EC region (e.g., using an EC scaling module) as describe herein, including symmetrical or asymmetric scaling.

Staging modules 1037 can include computer-program instructions that, when executed by processor(s) 1031, cause treatment planning system 1030 to identify target arrangements of dentition and intermediate arrangements to get a person's dentition from an initial arrangement toward a target arrangement. Staging modules 1037 can include instructions to add treatment plan features, such as attachments, stages to do various procedures (interproximal reduction (IPR)), etc.

Dental model transfer modules 1038 can include computer-program instructions that, when executed by processor(s) 1031, cause treatment planning system 1030 to transfer a 3D virtual model (e.g., one that has been ported and/or staged etc.) to doctor system 1020. Treatment planning database 1039 can include computer-program instructions storing treatment data.

The patient system 1040 can include a treatment visualization module 1041, an intraoral state capture module 1042, processor(s) 1043, and memory 1044. In general, the patient system 1040 can provide a "patient facing" interface to the computing environment 1000. The treatment visualization module 1041 can enable the patient to visualize how an orthodontic treatment plan has progressed and also visualize a predicted outcome (e.g., a final position of teeth).

In some examples, the patient system 1040 can capture dentition scans for the treatment visualization module 1041 through the intraoral state capture module 1042. The intraoral state capture module can enable a patient to capture his or her own dentition through the intraoral scanning system 1010. Although not shown here, the patient system 1040 can include one or more processors configured to execute any feasible non-transitory computer-readable instructions to perform any feasible operations described herein.

The appliance fabrication system 1050 can include appliance fabrication machinery 1051, processor(s) 1052, memory 1053, and appliance generation module 1054. In general, the appliance fabrication system 1050 can directly or indirectly fabricate aligners to implement an orthodontic treatment plan. In some examples, the orthodontic treatment plan may be stored in the treatment planning database(s) 1035.

The appliance fabrication machinery 1051 may include any feasible implement or apparatus that can fabricate any suitable dental aligner. The appliance generation module 1054 may include any non-transitory computer-readable instructions that, when executed by the processor(s) 1052, can direct the appliance fabrication machinery 1051 to produce one or more dental aligners. The memory 1053 may store data or instructions for use by the processor(s) 1052. In some examples, the memory 1053 may temporarily store a treatment plan, dental models, or intraoral scans.

The computer-readable medium 1060 may include some or all of the elements described herein with respect to the computing environment 1000. The computer-readable medium 1060 may include non-transitory computer-readable instructions that, when executed by a processor, can provide the functionality of any device, machine, or module described herein.

Figure 11:
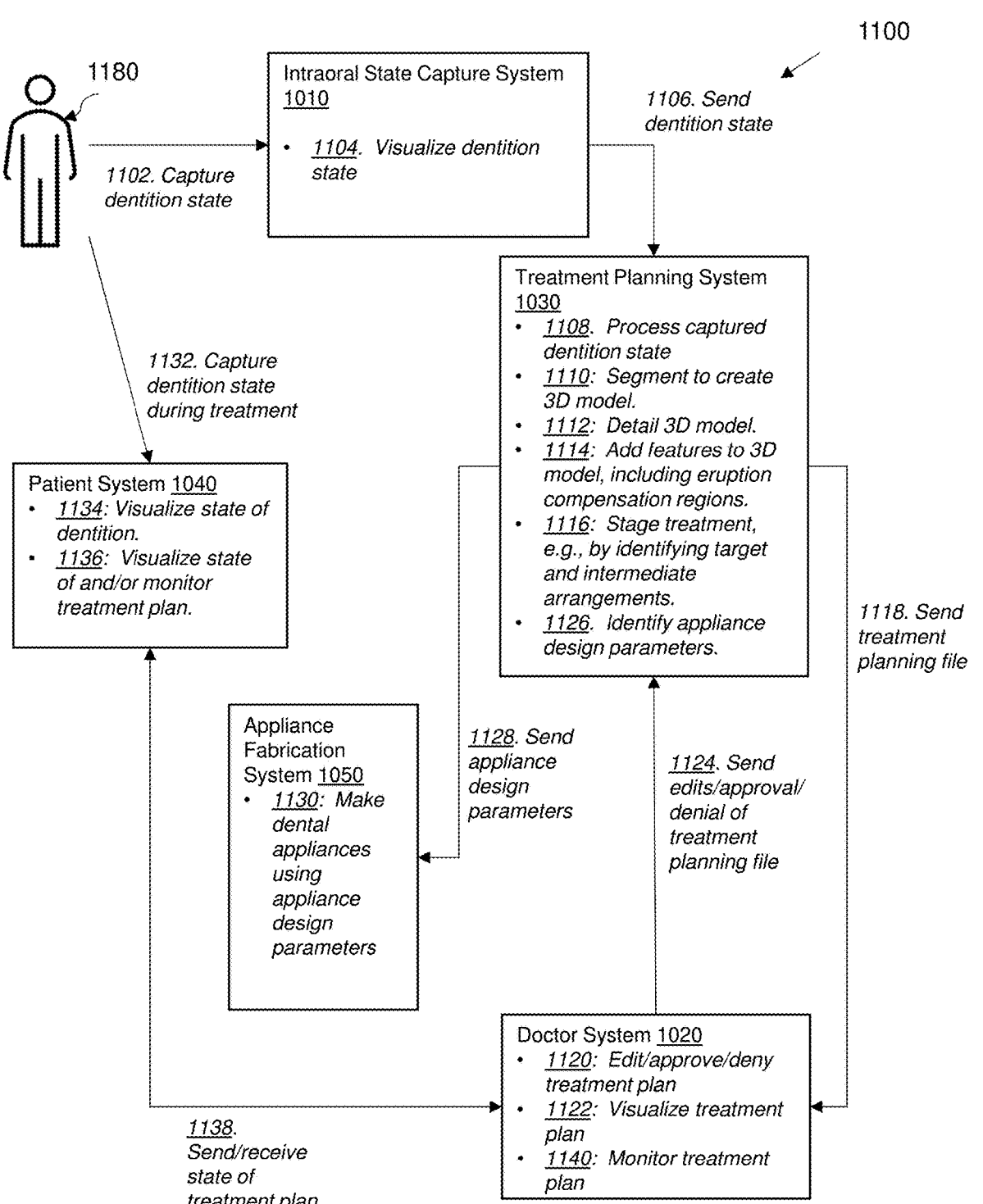
FIG. 11 schematically illustrates an example of an apparatus (e.g., system) for scaling an EC as described herein.

FIG. 11 illustrates an example of a process 1100 for making appliances using digital treatment plans that in turn use information captured from the physical world using an intraoral state capture system 1010. Any of the methods described herein for including an EC region may be included as part of the process shown in FIG. 11. The example of FIG. 11 shows person 1180, intraoral state capture system 1010, doctor system 1020, treatment planning system 1030, patient system 1040, and appliance fabrication system 1050. Examples of some or all of the elements of FIG. 10 can correspond to examples in FIG. 10. At operation 1102, intraoral state capture system 1010 captures a state of a dentition of person 1180. In various implementations, intraoral state capture system 1010 gathers one or more of: an intraoral scan, a radiograph, a cone beam representation, a photo, sensor data related to dentition of a person 1180, or some combination thereof. At operation 1010, intraoral state capture system 1010 provides a visualization of a state of a dentition of person 1180. A display on intraoral state capture system 1010 can be configured to show one or more attributes of a capture of a state of a dentition of person 1180. For example, pixels on a display on intraoral state capture system 1010 can operate to show the results of an intraoral scan, a radiograph, a cone beam representation, a photo, sensor data related to dentition of a person 1180, or some combination thereof.

At operation 1106, intraoral state capture system 1010 can send a captured state of a dentition of person 1180 to treatment planning system 1030. The results of an intraoral scan, a radiograph, a cone beam representation, a photo, sensor data related to dentition of a person 1180, or some combination thereof, can be sent over a computer-readable medium to treatment planning system 1030 for further processing, treatment planning, appliance generation, etc. At operation 1108, treatment planning system 1030 can process a captured state of a dentition of person 1180. Treatment planning system 1030 can decode any encoded elements and/or modify format(s) of a captured state of a dentition of person 1180 in order to perform further processing, treatment planning, appliance generation, etc. At operation 1110, treatment planning system 1030 can segment a captured state of a dentition of person 1180 to create a 3D virtual model of the dentition. "Segmenting" a representation, as used herein, can include breaking the representation into constituent parts of the representation and/or assigning labels/identifiers to the constituent parts. At operation 1112, treatment planning system 1030 can detail the 3D model, e.g., automatically or using instructions from a technician. At operation 1114, treatment planning system 1030 can add features, including eruption compensation regions, to the 3D virtual model. It is noted that any of the eruption compensation regions/locations detailed herein can be added. At operation 1116, treatment planning system 1030 can stage a treatment for the dentition, e.g., by identifying a target arrangement and a series of intermediate arrangements. Treatment planning system 1030 can create a treatment planning file representing therein target arrangement(s), intermediate arrangement(s), and/or other treatment planning data.

At operation 1118, treatment planning system 1030 can send a treatment planning file to doctor system 1020, which at operation 1120 can edit/approve/deny the treatment plan. Doctor system 1020 can support a UI that, through engagement with a doctor, can facilitate editing/approving/denying a treatment plan for dentition of person 1180. Doctor system 1020 can give a doctor capability to, e.g., modify eruption compensation regions, customize portions of stages, modify appliance features, etc. At operation 1122, doctor system 1020 can support visualizing a treatment plan. At operation 1124, doctor system 1020 can send edits/approval/denial/ etc. of a treatment planning file. In some implementations, doctor system 1020 sends the entire file back. In various implementations, doctor system 1020 sends only edits and/ or delta information related to a treatment planning file. Though not shown as an explicit step, treatment planning system 1030 can reconcile edits and/or provide updated treatment planning file(s) to doctor system 1020.

At operation 1126, treatment planning system 1126 can identify appliance design parameters, which, at operation 1128 can be provided to appliance fabrication system 1050. At operation 1030, appliance fabrication system 1050 can make dental appliances using appliance design parameters. As an example, appliance fabrication system 1050 can fabricate a series of aligners with eruption compensation regions that match the stages of a treatment plan.

At operation 1132, patient system 1040 can capture images of a dentition of person 1180, e.g., using a mobile phone camera. At operation 1134, patient system 1040 can visualize the state of the dentition, e.g., on a display on patient system 1040. At operation 1136, patient system 1040 can show a state of and/or monitor a treatment plan, e.g., through virtual care. At operation 1138, patient system 1040 and/or doctor system 1020 can send and/or receive a state of a treatment plan for a dentition of patient 1180.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points.

For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, the method comprising:

defining, on a segmented three-dimensional (3D) dental model of a subject's dentition, an eruption compensation (EC) region for accommodating an erupting tooth in the 3D dental model by:

identifying a virtual tooth model corresponding to the erupting tooth;

scaling the virtual tooth model, wherein the scaling comprises:

identifying a crown center line along a buccal-lingual axis of the virtual tooth model;

enlarging a lingual side of the virtual tooth model relative to the crown center line by a first scaling factor; and enlarging a buccal side of the virtual tooth model relative to the crown center line by a second scaling factor, wherein the first scaling factor is greater than the second scaling factor; and adding the scaled virtual tooth model to the 3D dental model of the subject's dentition at the EC region to form a modified 3D dental model; and outputting the modified 3D dental model including the scaled virtual tooth model corresponding to the erupting tooth.

2. The method of claim 1, wherein each of the first and second scaling factors range between about 1.05 and about 1.3.

3. The method of claim 1, further comprising adjusting a size, a shape, or a size and shape of a root portion of the scaled virtual tooth model such that the root portion remains within a gingival region of the modified 3D dental model.

4. The method of claim 3, wherein adjusting the size, the shape or the size and shape of the root portion comprises tapering the root portion of the scaled virtual tooth model.

5. The method of claim 1, further comprising identifying that the subject's dentition includes an erupting tooth, wherein the erupting tooth is unerupted or partially erupted.

6. The method of claim 5, wherein identifying the virtual tooth model corresponding to the erupting tooth comprises identifying the virtual tooth model from one or more of: a library of virtual tooth models, a scaled-up scan of the erupting tooth, a tooth adjacent to the unerupted or erupting tooth, an opposing tooth to the erupting tooth, or a counterpart tooth to the erupting tooth.

7. The method of claim 1, further comprising generating a treatment plan using the modified 3D dental model, wherein the treatment plan includes one or more treatment stage operations to move the subject's dentition from a first arrangement toward a target arrangement.

8. The method of claim 1, further comprising fabricating a dental appliance including an EC feature having a shape corresponding to the scaled virtual tooth model to provide space for the erupting tooth when the subject wears the dental appliance.

9. The method of claim 1, further comprising receiving one or more images of the subject's dentition and generating the segmented 3D dental model of the subject's dentition.

10. The method of claim 1, further comprising adjusting the first scaling factor and/or the second scaling factor to avoid collision of the EC region with a tooth of the opposing dental arch of the subject when the subject bites.

11. The method of claim 1, wherein defining the EC regions is part of a porting process to generate a treatment plan.

12. The method of claim 11, wherein the porting process comprises converting a first data file to a second data file, the second data file having a reduced size compared to the first data file.

13. The method of claim 1, wherein outputting comprises generating one or more dental appliances including the EC region.

14. The method of claim 1, wherein identifying the virtual tooth model comprises determining a geometry of the virtual tooth model based on a geometry of one or more teeth of the subject's dentition of the same type as the erupting tooth.

15. The method of claim 1, further comprising positioning the virtual tooth model within the 3D dental model of the subject's dentition prior to scaling the virtual tooth model.

16. A system comprising:
one or more computing devices comprising:
one or more processors;
memory operationally coupled to the one or more processors, wherein the memory includes computer-program instructions that, when executed by the one or more processors, cause the one or more computing devices to perform a computer-implemented method comprising:
defining, on a segmented three-dimensional (3D) dental model of a subject's dentition, an eruption compensation (EC) region for accommodating an erupting tooth in the 3D dental model by:
identifying a virtual tooth model corresponding to the erupting tooth;
scaling the virtual tooth model, wherein the scaling comprises:
identifying a crown center line along a buccal-lingual axis of the virtual tooth model;
enlarging a lingual side of the virtual tooth model relative to the crown center line by a first scaling factor; and
enlarging a buccal side of the virtual tooth model relative to the crown center line by a second scaling factor, wherein the first scaling factor is greater than the second scaling factor; and
adding the scaled virtual tooth model to the 3D dental model of the subject's dentition at the EC region to form a modified 3D dental model; and
outputting the modified 3D dental model including the scaled virtual tooth model corresponding to the erupting tooth.

17. A method, the method comprising:
defining, on a segmented three-dimensional (3D) dental model of a subject's dentition, an eruption compensation (EC) region for accommodating an erupting tooth in the 3D dental model by:
identifying a virtual tooth model corresponding to the erupting tooth;
asymmetrically scaling a lingual side and a buccal side of the virtual tooth model, wherein the asymmetrically scaling comprises identifying a crown center line along a buccal-lingual axis of the virtual tooth model, enlarging the lingual side relative to the crown center line by a first scaling factor, and enlarging the buccal side relative to the crown center line by a second scaling factor, wherein the first scaling factor is greater than the second scaling factor; and
adding the asymmetrically scaled virtual tooth model to the 3D dental model of the subject's dentition at the EC region to form a modified 3D dental model; and
outputting the modified 3D dental model including the asymmetrically scaled virtual tooth model corresponding to the erupting tooth.

18. The method of claim 17, further comprising adjusting the first scaling factor and/or the second scaling factor to avoid collision of the EC region with a tooth of the opposing dental arch of the subject when the subject bites.

* * * * *